(12) United States Patent
Imamura

(10) Patent No.: US 11,023,633 B2
(45) Date of Patent: Jun. 1, 2021

(54) HIGH-LEVEL SYNTHESIS METHOD, HIGH-LEVEL SYNTHESIS APPARATUS, AND HIGH-LEVEL SYNTHESIS SYSTEM

(71) Applicant: RENESAS ELECTRONICS CORPORATION, Tokyo (JP)

(72) Inventor: Shintaro Imamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/820,204

(22) Filed: Mar. 16, 2020

(65) Prior Publication Data
US 2020/0311328 A1    Oct. 1, 2020

(30) Foreign Application Priority Data
Mar. 26, 2019    (JP) ............................ JP2019-057749

(51) Int. Cl.
*G06F 30/327*    (2020.01)
*G06F 115/02*    (2020.01)

(52) U.S. Cl.
CPC ........ *G06F 30/327* (2020.01); *G06F 2115/02* (2020.01)

(58) Field of Classification Search
CPC ........................... G06F 30/327; G06F 2115/02
USPC .................................................. 716/101, 104
See application file for complete search history.

(56) References Cited

U.S. PATENT DOCUMENTS

| | | | |
|---|---|---|---|
| 10,685,159 B2 * | 6/2020 | Su etal. ..................... | G06N 5/04 |
| 10,761,951 B2 * | 9/2020 | Poornachandran et al. ................ | |
| | | | G06F 11/202 |
| 2017/0068764 A1 | 3/2017 | Takashina et al. | |

FOREIGN PATENT DOCUMENTS

WO    2015/155815 A1    10/2015

OTHER PUBLICATIONS

High-Level Synthesis Blue Book, ISBN 978-1-4500-9724-6.
Austemper Design's website, Item "Safety Synthesis", [Searched on Oct. 18, 2018], Internet<URL: http://www.austemperdesign.com/safety-synthesis/>.

* cited by examiner

*Primary Examiner* — Sun J Lin
(74) *Attorney, Agent, or Firm* — McDermott Will & Emery LLP

(57) ABSTRACT

Disclosed herein is a method of generating an RTL description that implements any functional safety system. A high-level synthesis method for generating an RTL description in which a functional safety system is inserted by using an operation description defining a functional logic, a high-level synthesis script defining a high-level synthesis constraint, and a functional safety system implementation specification specifying a functional safety system to be inserted in a high-level synthesis process. The high-level synthesis method includes a control data flow graph generation step in which a high-level synthesis unit generates a control data flow graph using the operation description, and a first function safety system insertion processing step in which the high-level synthesis unit inserts the function safety system into the control data flow graph according to the function safety system implementation specification after the control data flow graph generation step.

7 Claims, 48 Drawing Sheets

| (1) Target To Insert Safety System | | (2) Safety Circuit To Insert | (3) Error Check Input Signal | (4) Error Check Output Signal | (5) Error Check Executing Cycle | (6) Safety System Module Name |
|---|---|---|---|---|---|---|
| (1-1) Position Of Operation Description | Line Number Function Name Scope Variable Name Module Name Instance Name ... | Duplexing Triplexing Parity Check Sum CRC Humming Protocol Check Transmit Order Check | Output F/F Signal Name List ... | Port(Port Name, FF\|Comb) Reg(Register Name, Address) | Clock Cycle Count Enabling Control Real Time ... | Module Name |
| (1-2) High-level Synthesis Control Circuit | FSM Pipeline Enable Circuit ... | | | | | |

Estimation Result Of
Arithmetic Unit Latency $*$ : 8ns $+$ : 4ns $=$ : 2ns

FIG. 41
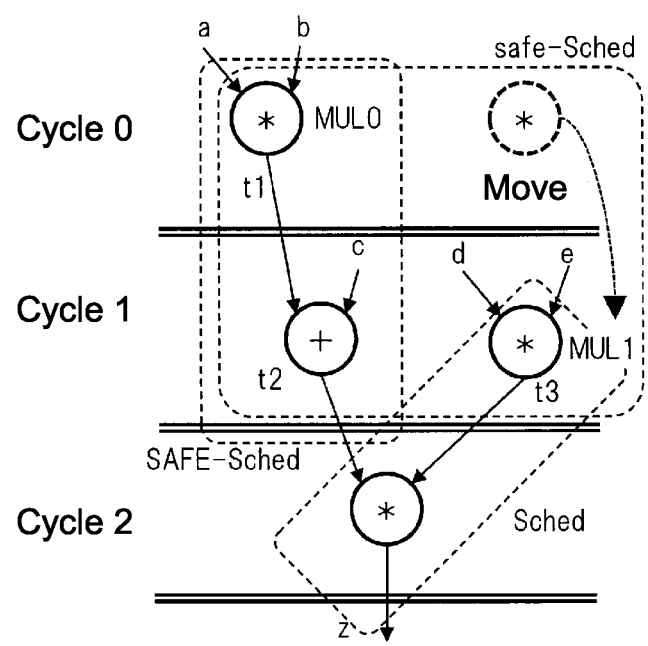
Estimation Result Of
Arithmetic Unit Latency
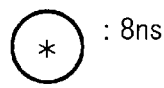 : 8ns
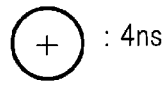 : 4ns

*FIG. 48*

```
                                                           150
Resource
    mul1: Input(a,b), Output(r3), Module(CHK)
    add1: Input(r3,c), Output(t5) , Module(CHK)
    r3: Input(mul1), Output(add1), Enable(vote0==s0), Module(CHK)
    cmp0: Input(r0,r3), Output(r5), Module(CHK)
    cmp1: Input(t2,t5), Output(r6), Module(CHK)
    r5: Input(cmp0), Enable(vote0==s1), Module(CHK)
    r6: Input(cmp1), Enable(vote0==s1), Module(CHK)
    or0: Input(cmp0, cmp1), Output(r4), Module(CHK)
    r4: Input(or0), Output(ERR), Enable(vote0==s1), Module(CHK)
    FSM1 (copy of FSM0), Module(CHK)
    FSM2 (copy of FSM0), Module(CHK)
    vote0: Input(FSM0,FSM1,FSM2),
           Output(Select signal of MUXs of mul0, r0, r1, r2, r3, r4, r5, r6),
           Module(CHK)

Module
    Name : CHK
    Input: a, b, c, r0, t2, FSM0
    Output: ERR, vote0
```

HIGH-LEVEL SYNTHESIS METHOD, HIGH-LEVEL SYNTHESIS APPARATUS, AND HIGH-LEVEL SYNTHESIS SYSTEM

CROSS-REFERENCE TO RELATED APPLICATIONS

The disclosure of Japanese Patent Application No. 2019-057749 filed on Mar. 26, 2019 including the specification, drawings and abstract is incorporated herein by reference in its entirety.

BACKGROUND

The present invention relates to a high-level synthesis method, a high-level synthesis apparatus, and a high-level synthesis system.

As circuit scales increase, integrated circuit designs using system level languages and programming languages are becoming increasingly popular. For conversion from a system level language or a programming language to a hardware description language, for example, a technique called high-level synthesis is known. A circuit configuration for realizing the content of the operation description is generated as a hardware description language by performing high-level synthesis using an operation description in which only the functional logic of the function realized as a circuit is specifically described and a high-level synthesis script for specifying the constraint of high-level synthesis. For high-level synthesis, for example, the following patent documents and non-patent documents are disclosed. There are disclosed techniques listed below.

[Non-Patent Document 1] High-Level Synthesis Blue Book, ISBN 978-1-4500-9724-6
[Patent Document 1] International Unexamined Patent Application Publication No. WO/2015/155815
[Non-Patent Document 2] Austemper Design's website, Item "Safety Synthesis", [Searched on Oct. 18, 2018], Internet <URL: http://www.austemperdesign.com/safety-synthesis/>

Non-Patent Document 1 describes general high-level synthesis. In the high-level synthesis, an RTL (Resister Transfer Level) description that can be logically synthesized is generated by inputting an operation description. In this process, processes such as CDFG creation, scheduling, binding, and control circuitry creation are performed based on the high-level synthesis constraints, and RTL descriptions are generated. In CDFG creation, data-dependencies between the various steps of the behavioral description are analyzed to create graphs that are internal representations. In the scheduling, timings for executing the operations described in the CDFG are determined. In binding, hardware resources are mapped to the respective operations of the CDFG. In the control circuit generating, a circuit for controlling the execution of the scheduled operation is generated.

Patent Document 1 discloses a circuit design device that includes an error countermeasure circuit and can design an integrated circuit that operates at a desired operating frequency. Characteristic inputs in the circuit design device are an error countermeasure library (delay information such as a majority circuit) and a target number of insertions of error countermeasures. The circuit-designing device divides the scheduled CDFG into operation paths, and calculates the delay amounts when error-countermeasures are added to the respective operation paths. If the delay amount is smaller than the target delay amount, the circuit design apparatus generates an RTL description in which error countermeasures such as triplexing are applied to the operation path.

In addition, the circuit design apparatus limits the number of error countermeasures to be performed according to the input target insertion number of error countermeasures. If the target number of insertions of the error countermeasure is not reached, the circuit design device subdivides the operation path to which the error countermeasure is not applied. The circuit design device calculates a delay amount when error countermeasures are applied to each of the divided operation paths, and determines whether or not to implement error countermeasures.

In Non-Patent Document 2, RTL description conversion for adding an error detection circuit and an error correction circuit to a circuit structure determined by RTL or a specified circuit element is performed. The RTL description and the macro list/FF list are input, and an RTL description to which an error detection circuit and an error correction circuit are added is generated.

SUMMARY

In developing integrated circuits such as in-vehicle SoCs (System on Chip), IP modules to be mounted are sometimes required to be mounted with functional safety systems. In the high-level synthesis, not all the circuit elements are described in the operation description as the input, and all the circuit elements are described in the RTL description which is the output of the high-level synthesis.

In Non-Patent Document 1, the function safety system is a system for detecting a hardware failure, and when a hardware failure is not assumed, it is a redundant logic that does not affect the original function described in the operation description.

Higher-level compositing generates RTL descriptions after deleting and optimizing redundant logics when creating a CDFG from the behavioral descriptions. In the high-level synthesis, no hardware failure is assumed. Therefore, even if the functional safety system is described in the operation description and the high-level synthesis is executed, the logic of the functional safety system is determined as the redundant logic, and the redundant logic is deleted. Therefore, the conventional high-level synthesis has a problem that the circuit of the functional safety system described in the operation description is not reflected in the RTL description.

In Patent Document 1, high-level synthesis can generate an RTL description with error countermeasures. However, Patent Document 1 focuses on the calculation of the delay amount when error countermeasures are applied to the operation path, and therefore, it is impossible to implement an appropriate functional safety system for a specific logic of the operation description.

Further, when a functional safety system is to be implemented for an RTL description generated from high-level synthesis, it is difficult to manually determine what logic each RTL description is a circuit element realizing, even if only the RTL description is viewed. Therefore, in order to implement the functional safety system in the conventional integrated circuit design using high-level synthesis, it is necessary to output the correspondence relationship between the operation description and the RTL description from the high-level synthesis, and extract the RTL description corresponding to the circuit element that needs to implement the functional safety system based on the information.

Thus, it has been extremely difficult to implement an arbitrary functional safety system for RTL description in a circuit design using high-level synthesis.

Other objects and novel features will become apparent from the description of this specification and the accompanying drawings.

Although the high-level synthesis method and the like of a plurality of embodiments are described in this specification, the high-level synthesis method of one embodiment will be described as follows. The high-level synthesis method generates an RTL description in which a functional safety system is inserted by using an operation description defining a functional logic, a high-level synthesis script defining a high-level synthesis constraint, and a functional safety system implementation specification specifying a functional safety system to be inserted in the process of high-level synthesis. The high-level synthesis method includes a control dataflow graph generation step in which the high-level synthesis unit generates a control dataflow graph using an operation description, and a first functional safety system insertion processing step in which the high-level synthesis unit inserts a functional safety system into the control dataflow graph according to the functional safety system implementation specification after the control dataflow graph generation step.

According to one embodiment, it is possible to generate an RTL description implementing any functional safety system.

BRIEF DESCRIPTION OF THE DRAWINGS

FIG. 3 is a diagram illustrating a functional safety system implementing specification.

FIG. 41 is a diagram for explaining how to schedule a safe-CDFG.

FIG. 48 is a diagram showing an example of a functional safety system implementing instruction.

DETAILED DESCRIPTION

Figure 1:
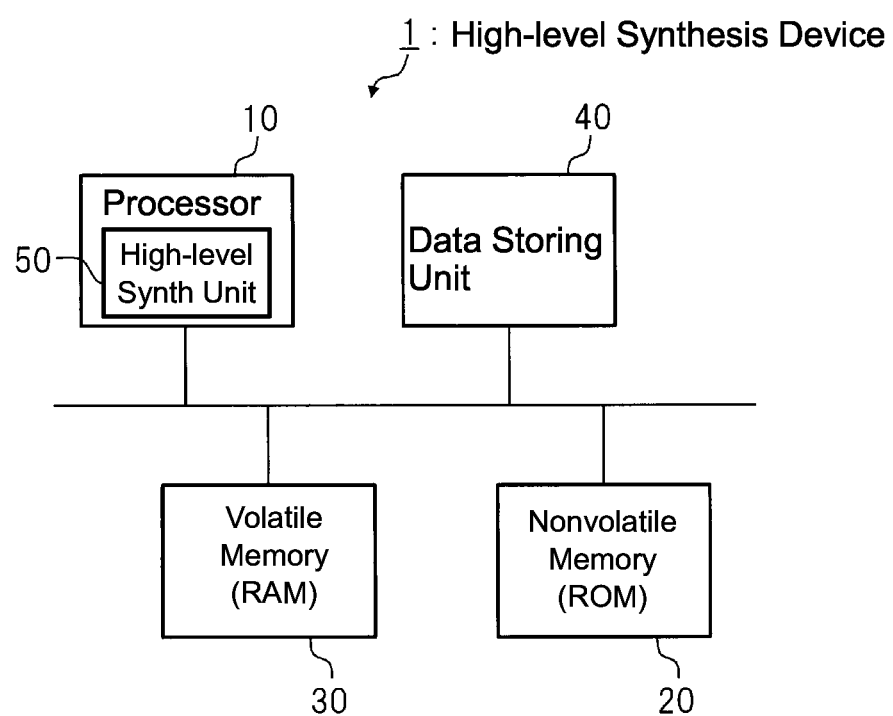
FIG. 1 is a configuration diagram showing an example of a high-level synthesizing apparatus according to Embodiment 1 of the present invention.

Hereinafter, embodiments of the present invention will be described in detail with reference to the drawings. In all the drawings for explaining the embodiments, the same portions are denoted by the same reference numerals in principle, and repetitive descriptions thereof are omitted.

Figure 2:
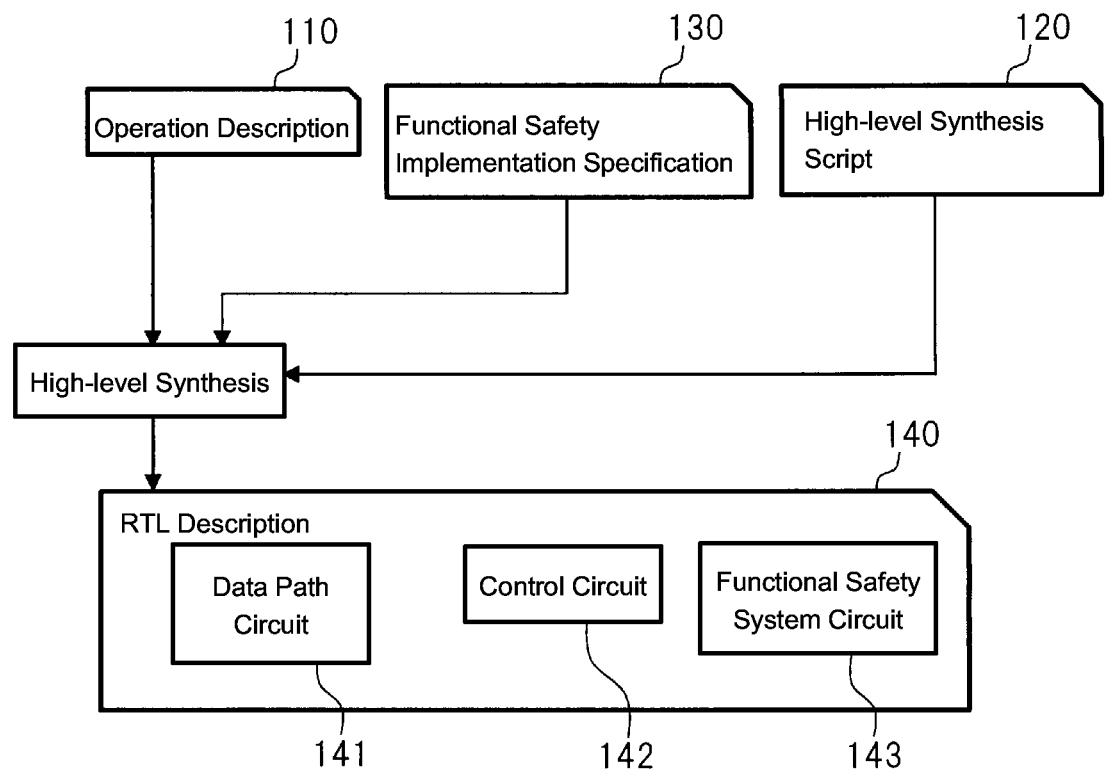
FIG. 2 is an explanatory diagram showing an outline of high-level synthesis.

FIG. 1 is a configuration diagram showing an example of a high-level synthesizing apparatus according to Embodiment 1 of the present invention. FIG. 2 is an explanatory diagram showing an outline of high-level synthesis. As shown in FIG. 1, a processor 10, a nonvolatile memory 20, a volatile memory 30, a data storage unit 40, and the like are provided. These elements may be connected to an internal bus or may be connected to each other by individual wiring. The high-level synthesizing apparatus 1 is, for example, an information processing apparatus or the like having a processor.

The processor 10 reads the high-level synthesis program stored in the nonvolatile memory 20, and expands the high-level synthesis program in the volatile memory 30. The processor 10 executes the high-level synthesizing program expanded in the volatile memory 30, thereby configuring a high-level synthesizing unit 50 that performs high-level synthesizing.

As shown in FIG. 2, the high-level synthesizing unit 50 performs high-level synthesizing using the operation description 110 in which the functional logic of the circuit to be created is described, the high-level synthesizing script 120, and the function safety system implementation specification 130 in which the function safety system to be implemented is described as input, and generates the RTL description 140 in which the specific circuit configuration including the function safety system is described in the hardware description language as a high-level synthesizing result. The processor 10 may store the input data such as the operation description 110, the high-level synthesis script 120, the functional safety system implementation specification 130, and the generated RTL description 140 in the data storage unit 40, which is a memory.

The nonvolatile memory 20 stores, for example, a program such as a high-level synthesizing program, setting information about the high-level synthesizing apparatus 1, and the like. The nonvolatile memory 20 includes, for example, a memory such as a flash memory EEPROM. The volatile memory 30 temporarily holds a program, setting information, and the like read from the nonvolatile memory 20. In addition, the volatile memory 30 also temporarily holds a calculation result and the like in the processor 10 including the high-level synthesizing unit 50. The data storage unit 40 is, for example, a memory that stores input data relating to high-level synthesis, calculation results in each step until an RTL description is generated, and the like. The data storage unit 40 includes, for example, a flash memory.

In the operation description 110, the operation content of the circuits to be created is described in, for example, a system-level language such as SystemC, a programming language such as C, or the like. The high-level synthesis script 120 describes a circuit generated by high-level synthesis, and contents defining constraints of high-level synthesis such as execute timing of each calculator.

In the functional safety system implementing specification 130, contents specifying what functional safety system is to be mounted by high-level synthesis are described.

The RTL description 140 describes the contents defining the data path circuit 141, the control circuit 142, the functional safety system circuit 143, and the like as the high-level synthesis result. The functional safety system circuit 143 is, for example, an RTL description created in accordance with the contents of the functional safety system implementing specification 130.

<Details of the functional safety system implementing specifications> Next, details of the functional safety system implementing specifications will be described. FIG. 3 is a diagram illustrating a functional safety system implementing specification. FIG. 3 lists the items described in the Functional Safety System Implementation Specification 130. Specifically, the functional safety system implementation specification 130 includes, for example, (1) a target to which the functional safety system is to be inserted, (2) a functional safety system to be inserted, (3) an error check input signal, (4) an error check output signal, (5) an error check execution cycle, and (6) a functional safety system module name.

Firstly, an item of "an object to insert a functional safety system" will be described. In this item, an object to which the functional safety system is to be inserted is specified. As shown in FIG. 3, the "object to which the functional safety system is inserted" further includes items of (1-1) the position of the operation description, and (1-2) the high-level synthesis control circuit.

In the item "position of operation description", the position of the action description into which the function safety system is to be inserted is specified by, for example, a line number, a function name, a scope, a variable name, a module name, an instance name, and the like of the action description 110. The high level synthesizer 50 implements a functional safety system for the circuit elements that implement the logic of the behavioral description of the position specified here.

Figure 4:
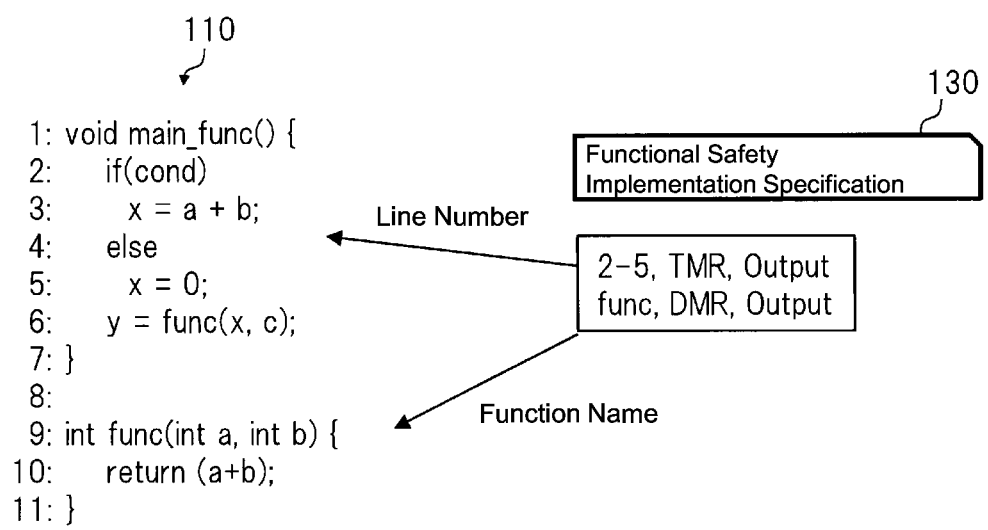
FIG. 4 is a diagram illustrating a method of specifying a position to insert a functional safety system using a line number and a function name.

FIG. 4 is a diagram illustrating a method of specifying a position to insert a functional safety system using a line number and a function name. In FIG. 4, an operational description 110 is shown on the left and a functional safety system implementation specification 130 is shown on the right. The first line of the Functional Safety System Implementation Specifications 130 describes "2-5, TMR, Output". This indicates that the description on the second-fifth line in the operation description is designated as a target to which the function safety system is inserted. In the second line of the functional safety system implementing specifications 130, "func, DMR, Output" is described. This indicates that the function name "func" in the behavioral description is specified as the target into which the functional safety system is inserted.

Further, in order to satisfy the constraints specified by the high-level synthesis script 120 such as the operating frequency, a circuit element may be added to the position of the operation description specified by the functional safety system implementation specification 130 by the high-level synthesis. In the present embodiment, this circuit element is also included in the implementing object of the functional safety system.

Figure 5:
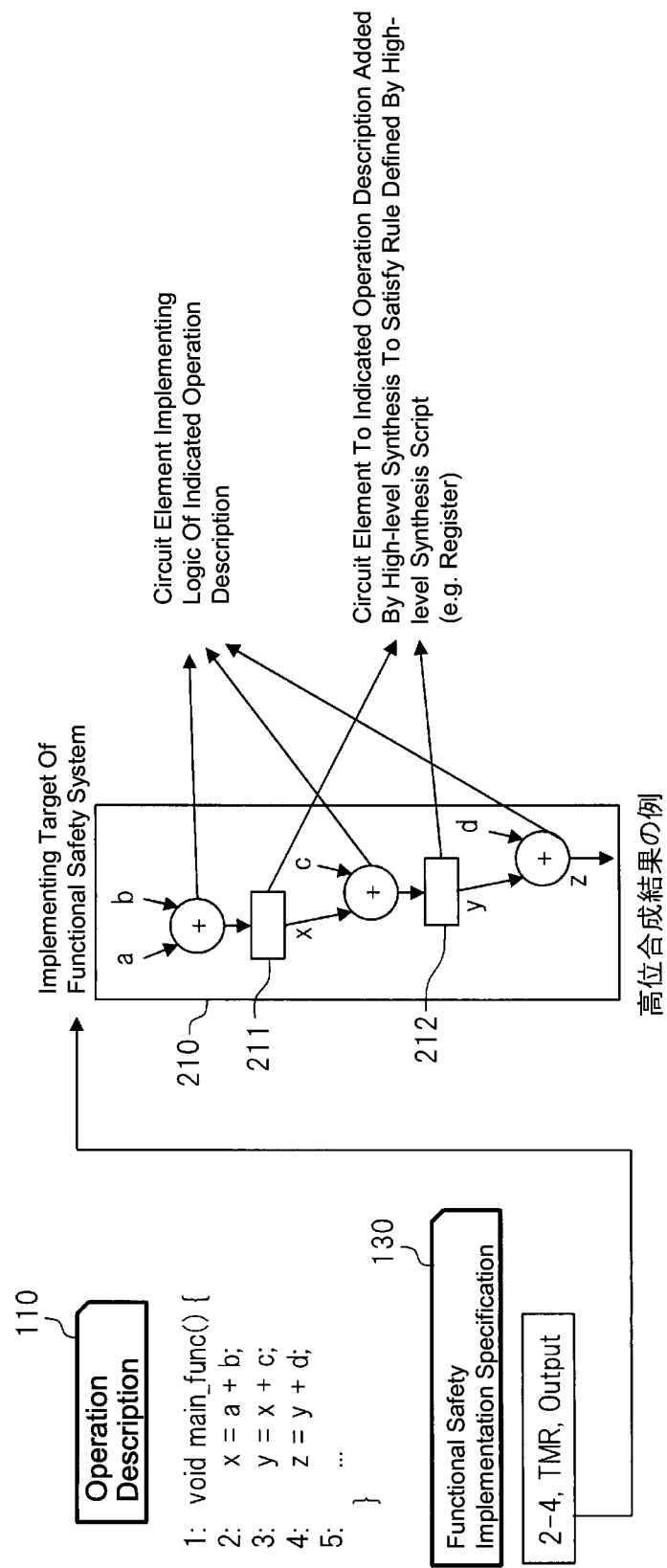
FIG. 5 is a diagram for explaining a case where a functional safety system is implemented for a circuit element added by high-level synthesis.

FIG. 5 is a diagram for explaining a case where a functional safety system is implemented for a circuit element added by high-level synthesis. FIG. 5 illustrates a behavioral description 110, a functional safety system implementation specification 130, and a circuit 210 corresponding to a high-level composite result. According to the functional safety system implementation specification 130, the description of the second-fourth line in the operation description is designated as the target of the functional safety system. In order to satisfy the constraints specified in the high-level synthesis script when the high-level synthesis is executed, registers 211 and 212 are added to the circuit 210 as circuit elements. In the present embodiment, a circuit element such as a register added by designation of a high-level synthesis script is also a target for implementing a function safety system.

Next, the item "high-level synthesis control circuit" will be described. The following is a description of the item "high-level synthesis control circuit". In the high-level synthesis, in order to satisfy the constraint content of the high-level synthesis described in the high-level synthesis script 120, a cycle operation is implemented, and a circuit for controlling the cycle operation is generated. Therefore, a circuit to which a functional safety system is to be inserted is specified by specifically specifying a circuit name for controlling the cycle operation. The circuit specified here is, for example, a finite automaton (FSM: Finite State Machine), a pipeline enable circuit, or the like.

Figure 6:
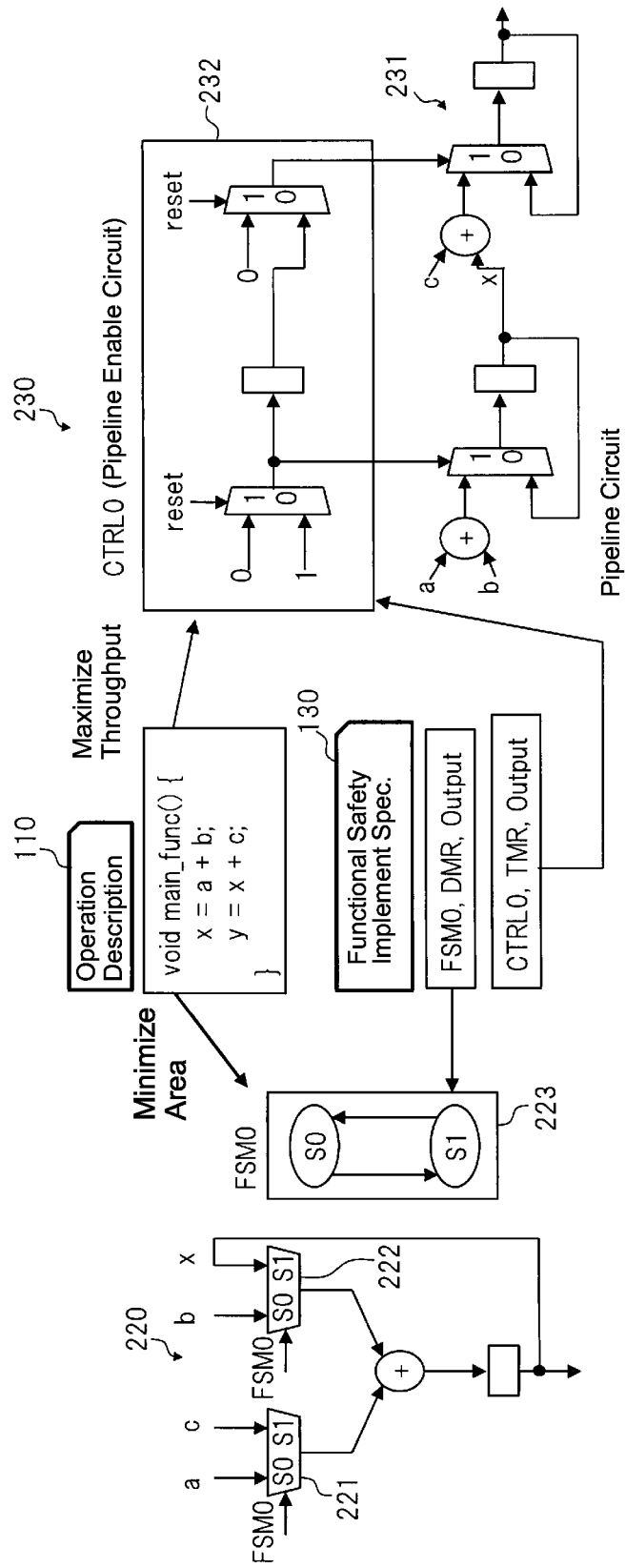
FIG. 6 is a diagram illustrating a method of specifying a position where a functional safety system is inserted by a circuit name for controlling a cycle operation.

FIG. 6 is a diagram illustrating a method of specifying a position where a functional safety system is inserted by a circuit name for controlling a cycle operation. FIG. 6 illustrates a behavioral description 110, a functional safety system implementation specification 130, and circuits 220, 230 corresponding to high-level composite results. The circuit 220 is an example of a high-level synthesis result in the case where the area is specified to be minimum by the high-level synthesis script 120. In addition to the selection circuits 221 and 222, a finite automaton 223 is added to the circuit 220. Although each state is described below as a St0, St1 or the like, each state is displayed as S0, S1, or the like in each drawing of FIG. 6 or the like. Here, S represents a state, and does not represent each step in the flow chart described later.

In the selector 221, the St0 input is "a" and the St1 input is "c". In the selector 222, the St0 input is "b" and the St1 input is "x". The finite automaton 223 switches states between St0 and St1. The finite automaton 223 first sets the states to St0 and outputs corresponding signals to the selection circuits 221 and 222. The selection circuits 221 and 222 output the values "a" and "b" of the St0 inputs, respectively. Next, the finite automaton 223 switches the states to St1, and outputs corresponding signals to the selection circuits 221 and 222. The selection circuits 221 and 222 output the values "c" and "x" of the St0 inputs, respectively. Although the operation description 110 includes two additions, as a result of the high-level synthesis, the circuit is configured by only one adder by adding the finite automaton 223. This minimizes the area.

On the other hand, the circuit 230 is an example of a high-level synthesis result in the case where the high-level synthesis script 120 designates the maximum throughput. In addition to the pipeline circuit 231, a pipeline enable circuit (CTRL0) 232 is added to the circuit 230.

The pipeline enable circuit 232 is a circuit for enabling the circuit in the order of the first stage and the second stage with respect to the pipeline circuit 231. When the circuit of the first stage is enabled, the calculation result x of a+b is output. Then, when the pipeline enable circuit (CTRL0) 232 sets the second-stage circuit to enable, the calculation result (y) of x+c is outputted. Since the pipeline enable circuit 232 finally enables the circuit of the first stage and the circuit of the second stage at the same time, throughput is maximized.

In the functional safety system implementing specifications 130, the added finite automaton (FSM0) and pipeline enable circuits (CTRL0) are designated as targets of the functional safety system.

<<(2) Functional safety system to be inserted>> Next, the items of "Functional safety system to be inserted" will be described. In this item, a circuit or the like used as a functional safety system is specified. Inserted functional safety systems include, for example, redundancy, such as duplexing, dual core lock steps, triplexing, and the like. The functional safety systems to be inserted include code generation for detecting and correcting errors such as parities, checksums, cyclic redundancy check (Cyclic Redundancy Check), hamming, and the like, protocol check in data transfer, transfer order check, and the like. For the designation of the functional safety system, for example, the functional safety system supported by the high-level synthesis program is presented in advance, and the user may select and designate the functional safety system from among the presented functional safety systems.

Figure 7:
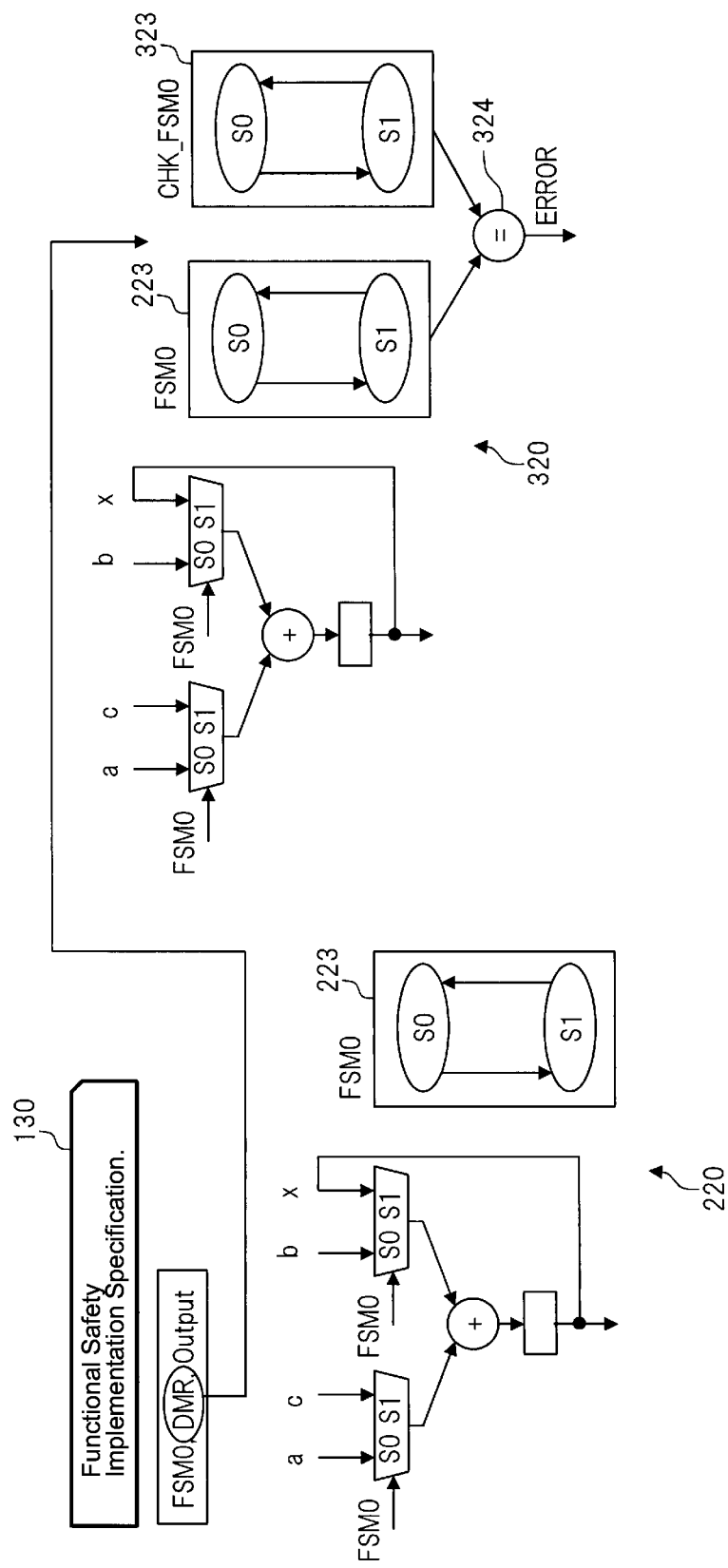
FIG. 7 is a diagram for explaining an example of a functional safety system to be inserted.

FIG. 7 is a diagram for explaining an example of a functional safety system to be inserted. FIG. 7 shows a case where the functional safety system implementation specification 130 specifies that a finite automaton (FSM0) generated by high-level synthesis is to be duplicated (DMR). On the left side of FIG. 7, a functional safety system implementation specification 130 and a non-duplexed circuit 220, see FIG. 6, are shown for reference. On the right side of FIG. 7, a circuit 320 is shown having a circuit duplicated according to the specification of the functional safety system implementation specification 130.

More specifically, a finite automaton (CHK_FSM0) 323 having the same configuration as the finite automaton (FSM0) 223 is added by high-level combining. A comparison circuit 324 for comparing the output signals of the duplicated finite automata is also added. The comparison circuit 324 generates and outputs a signal notifying the comparison result.

Figure 8:
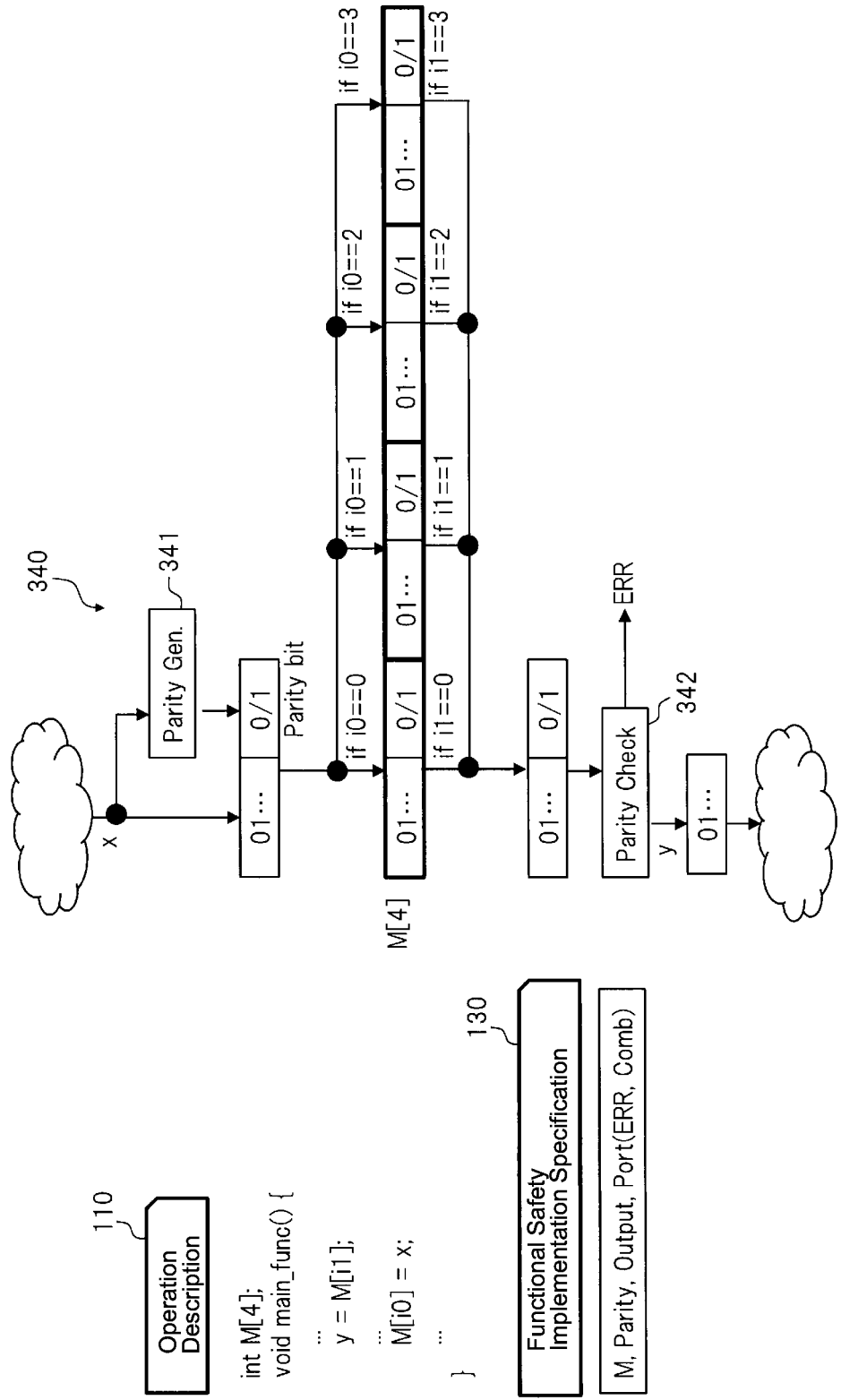
FIG. 8 is a diagram for explaining another example of the functional safety system to be inserted.

FIG. 8 is a diagram for explaining another example of the functional safety system to be inserted. FIG. 8 shows a case where the parity check system (Parity) is designated to be implemented for the array variables (M) by the functional safety system implementation specification 130. FIG. 8 shows a circuit 340 in which the parity check system is implemented in accordance with the specification of the functional safety system implementation specification 130.

Specifically, the parity bit check circuit 342 is added to the read side of the parity bit generation circuits 341 and M[4] on the write side of M[4] by high-order synthesis. The parity bit check circuit 342 generates and outputs a signal for notifying the result of the parity check.

Figure 9:
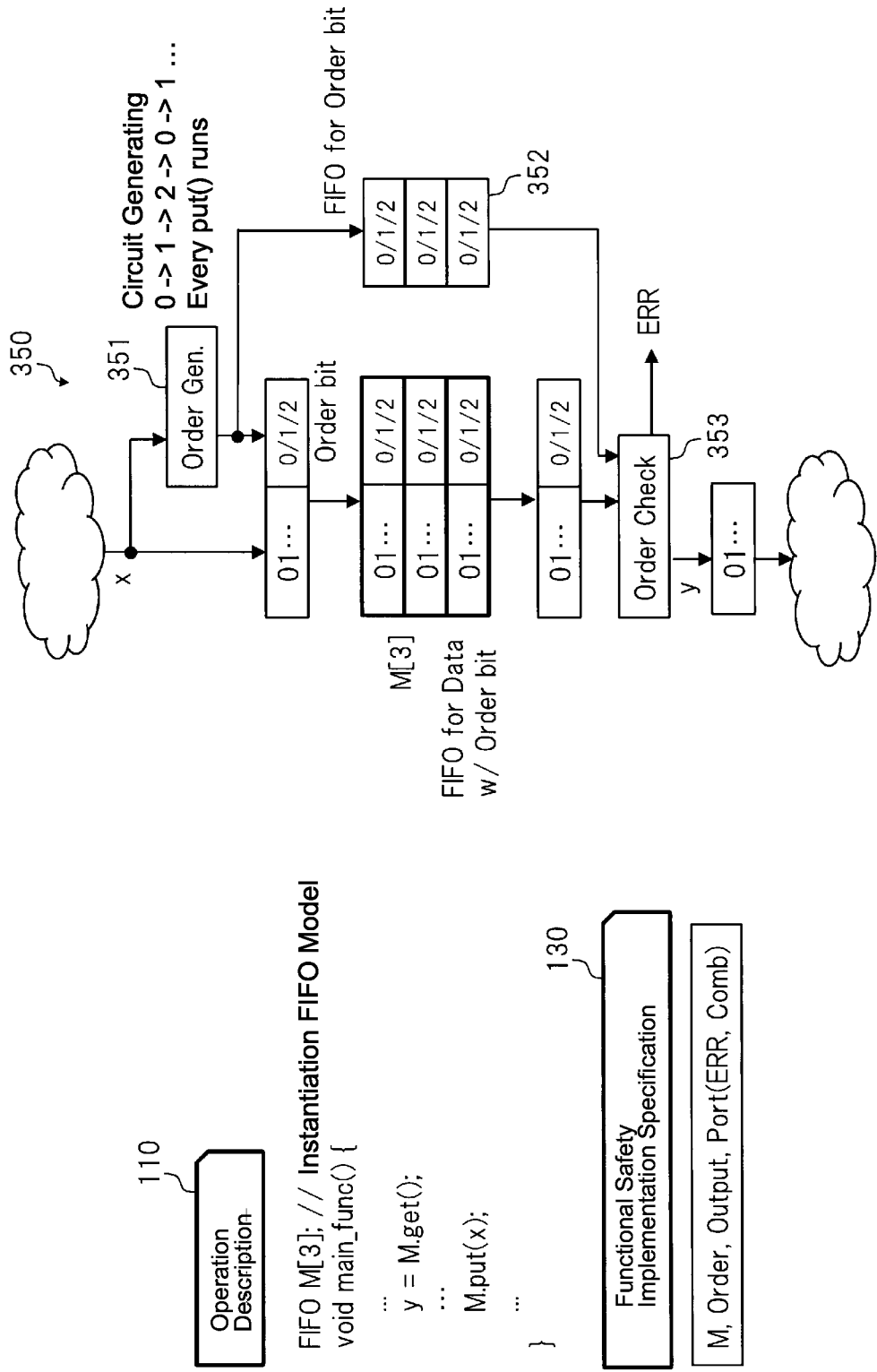
FIG. 9 is a diagram for explaining another example of the functional safety system to be inserted.

FIG. 9 is a diagram for explaining another example of the functional safety system to be inserted. FIG. 9 shows a case where the data transfer order checking system (Order) is designated to be implemented for the data transfer order checking system (FIFO (First In First Out) by the functional safety system implementing specification 130. FIG. 9 shows a circuit 350 in which the data transfer order check system is implemented in accordance with the specification of the functional safety system implementation specification 130.

More specifically, the high-order synthesis adds the data transfer order bit generation circuit 351 to the write side of M[3]. In addition, high-order synthesis adds the same number of stages as M (three stages in FIG. 9) of FIFO 352 for storing the data-transfer order bits. The high-level synthesis adds a data transfer order check circuit 353 to the read side of M[3].

<<(3) error check input signal>> Next, the item of "error check input signal" will be described. In this item, an input signal to be error-checked in the functional safety system is specified. Examples of the input signal to be error-checked include an output signal (Output) to be inserted with a functional safety device, an output signal such as a flip-flop (F/F) or a register. Further, it may be specified by a specific signal name.

Figure 10:
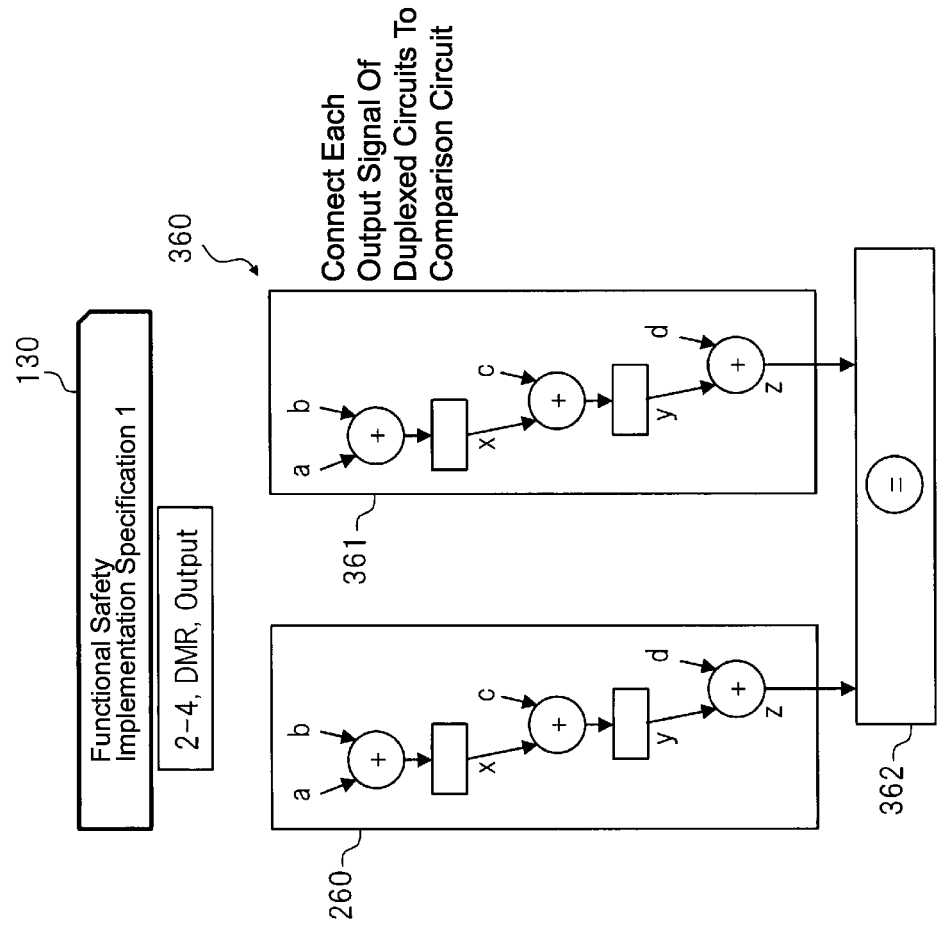
FIG. 10 is a diagram showing an example of a method of specifying an input signal to be error-checked.

FIG. 10 is a diagram showing an example of a method of specifying an input signal to be error-checked. FIG. 10 shows a case where the functional safety feature implementing specification 130 specifies that the output signals (Output) of the duplexed (DMR) circuits are error-checked. FIG. 10 shows an operation description 110 and a functional safety system implementation specification 130, respectively.

In FIG. 10, an example of the binding result of the high-level synthesis is shown as a circuit 360. Circuit 260 represents the original circuit prior to duplexing, and circuit 361 represents the circuit added by duplexing as specified by Functional Safety System Implementation Specification 130.

More specifically, by high-level synthesis, the circuit 360 includes a circuit 361 having a configuration similar to that of the circuit 260, and a comparison circuit 362 added to the circuit 260. The comparison circuit 362 receives an output signal of the circuit 260 and an output signal of the circuit 361, and outputs a comparison result obtained by comparing the two output signals. As described above, in the example of FIG. 10, the output signal output from the circuit designated as the target of inserting the function safety system is designated as the check target of the function safety system circuit with respect to the high-level synthesis result.

Figure 11:
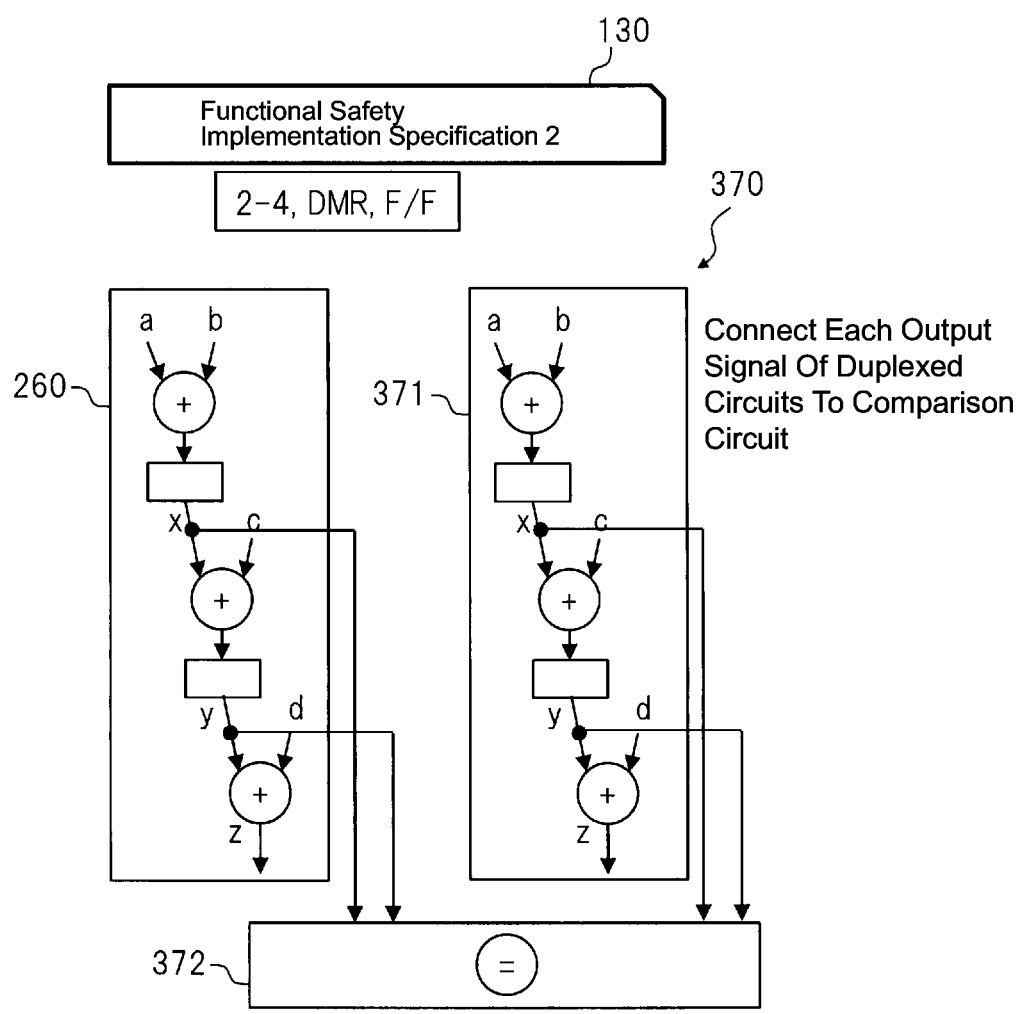
FIG. 11 is a diagram showing another example of a method of specifying an input signal to be error-checked.

FIG. 11 is a diagram showing another example of the error checking method. In FIG. 11, an output signal of a flip-flop (F/F) or a register is designated as an input signal of an error check by the functional safety system implementing specification 130. The circuit 370 of FIG. 11 shows a circuit duplicated according to the specification by the functional safety system implementing specification 130. The output signals of the circuit 260 and the flip-flop circuits included in the circuit 371 added for duplexing the circuit 260 are input to the comparison circuit 372. As described above, in the example of FIG. 11, an output signal output from a storage element such as a flip-flop or a register of a circuit which is a high-level synthesis result is designated as a check target of the functional safety system circuit.

Figure 12:
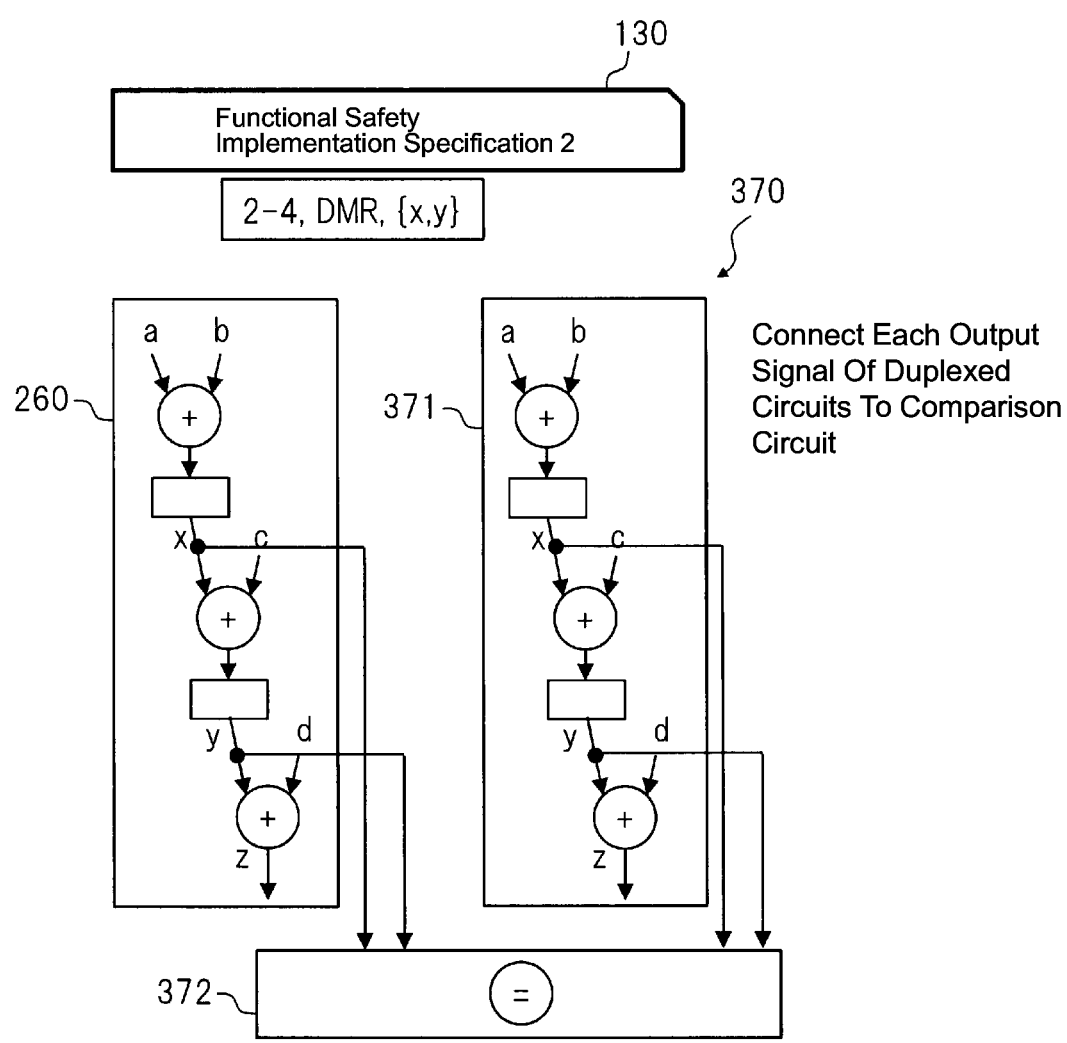
FIG. 12 is a diagram showing another example of a method of specifying an input signal to be error-checked.

FIG. 12 is a diagram showing another example of the error checking method. In FIG. 12, a signal {x, y} is specified as an input signal for error check by the functional safety system implementation specification 130. The example of FIG. 12 is the same as that of FIG. 11 except that the designation method of the input signal of the error check is changed to a specific signal name {x, y}. As described above, in the example of FIG. 12, the name of the signal in the circuit designated as the insertion target of the functional safety system is designated, and the designated signal becomes the check target of the functional safety system circuit. The signal name may be specified not only for the high-level synthesis result but also for the operation description. The output signal to be checked may be specified by combining these three methods.

<<(4) error check output signal>> Next, the item of "error check output signal" will be described. In this item, a method of generating a circuit for notifying an error check result of the functional safety system to the outside is specified. For example, a port name (Port), a register name (Reg), or the like is specified in order to notify an error check result of the functional safety system to the outside.

When the port name is specified, the error check logic is connected to the output port of the specified name. When the port of the specified name does not exist in the operation description, the port of the specified name is generated in the high-level synthesis. When "Comb" is specified together with the port name, a signal for notifying an error check result is generated to the outside of the port name without passing through a storage device such as a flip-flop. On the other hand, when "FF" is specified together with the port name, a signal is generated which causes a storage element such as a flip-flop to pass, and notifies an error check result to the outside.

Figure 13:
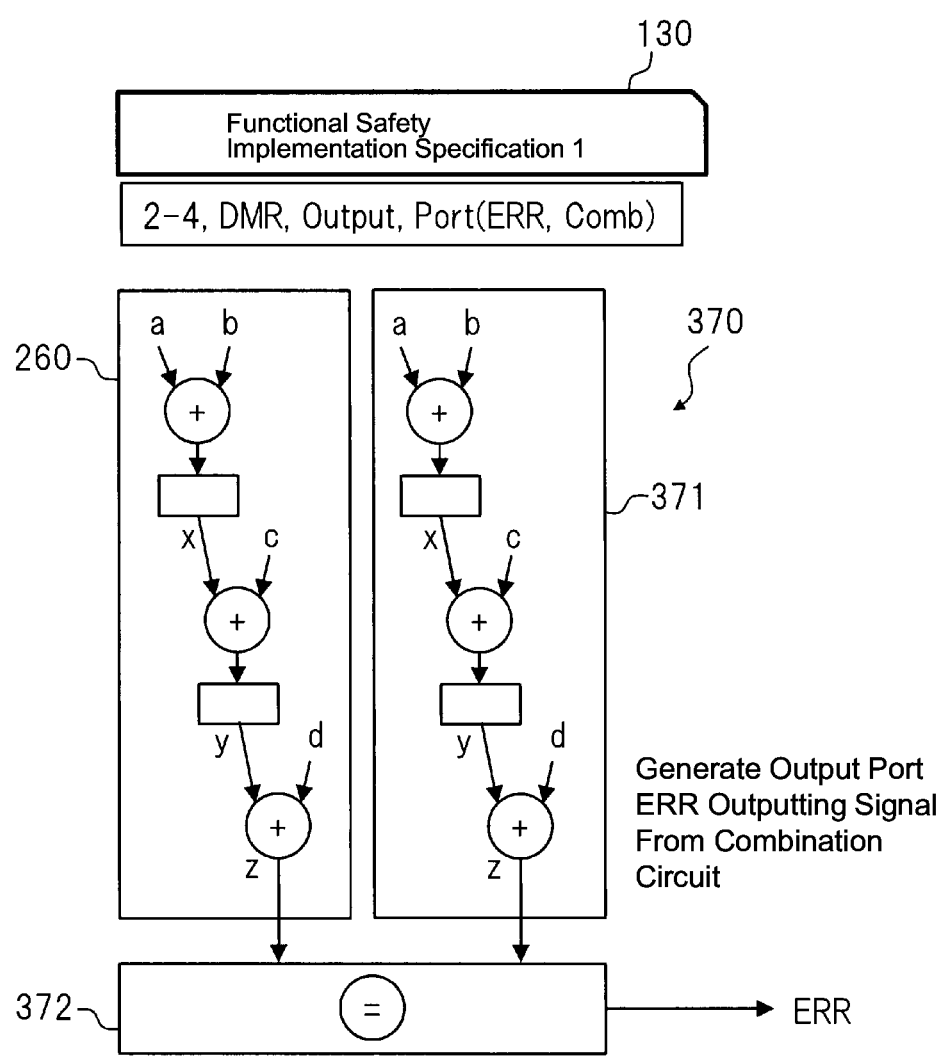
FIG. 13 is a diagram showing an example of a method of specifying an error check output signal by an output port.

Also here, a method of specifying the error check output signal will be described using the binding result of the high-level synthesis shown in FIG. 10. FIG. 13 is a diagram showing an example of a method of specifying an error check output signal by an output port. In FIG. 13, the output port "ERR" is designated. In addition, "Comb" is designated together with the output ports. For this reason, the high-level synthesis generates an output port ERR directly connected to the output of the comparator circuit 372 configured as a combinational circuit.

Figure 14:
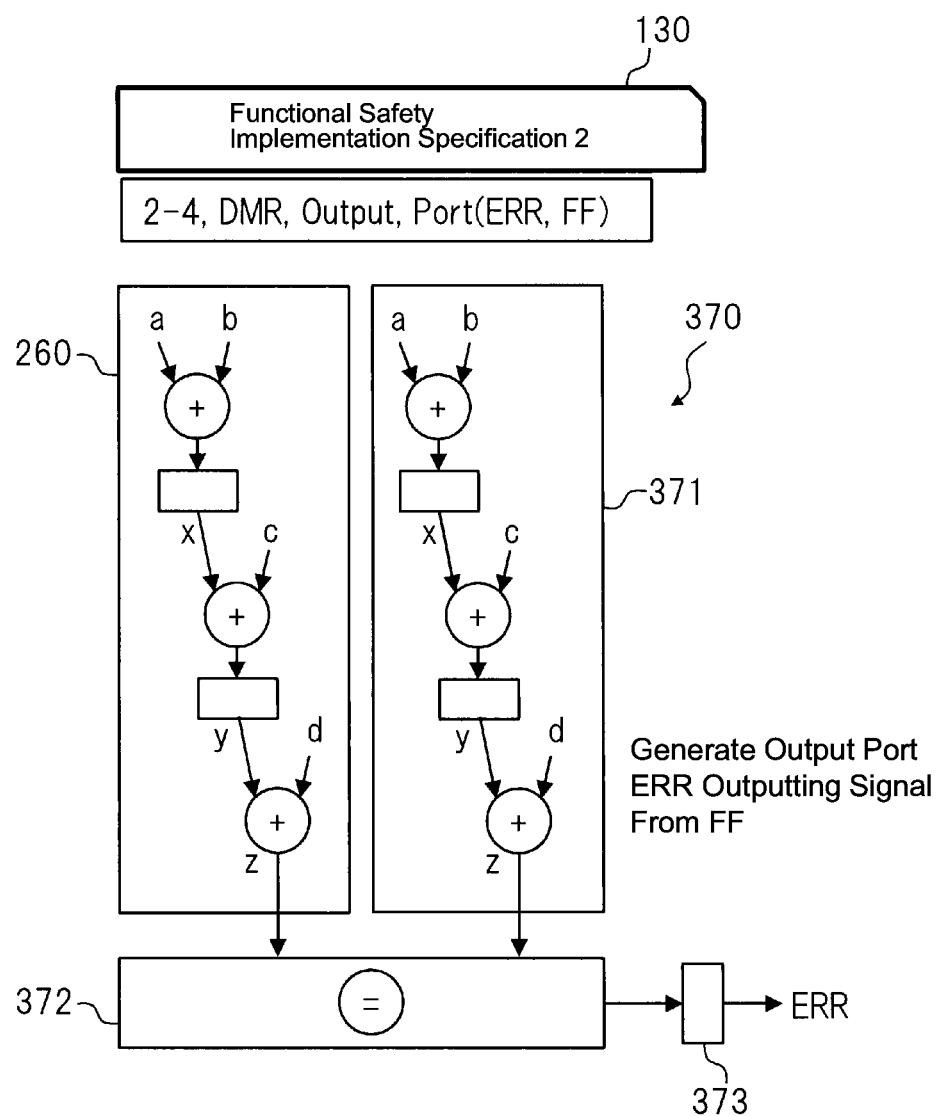
FIG. 14 is a diagram showing another example of a method of specifying an error check output signal by an output port.

FIG. 14 is a diagram showing another example of the error checking method by the output port. In FIG. 14, "FF" is designated together with the output port "ERR". Therefore, the output of the comparison circuit 372 is input to the flip-flop circuit 373 by high-level synthesis, and an output port ERR connected to the output of the flip-flop circuit 373 is generated. When "FF" is specified as described above, the error check result is output while the error check result is stored in the flip-flop circuit 373.

Figure 15:
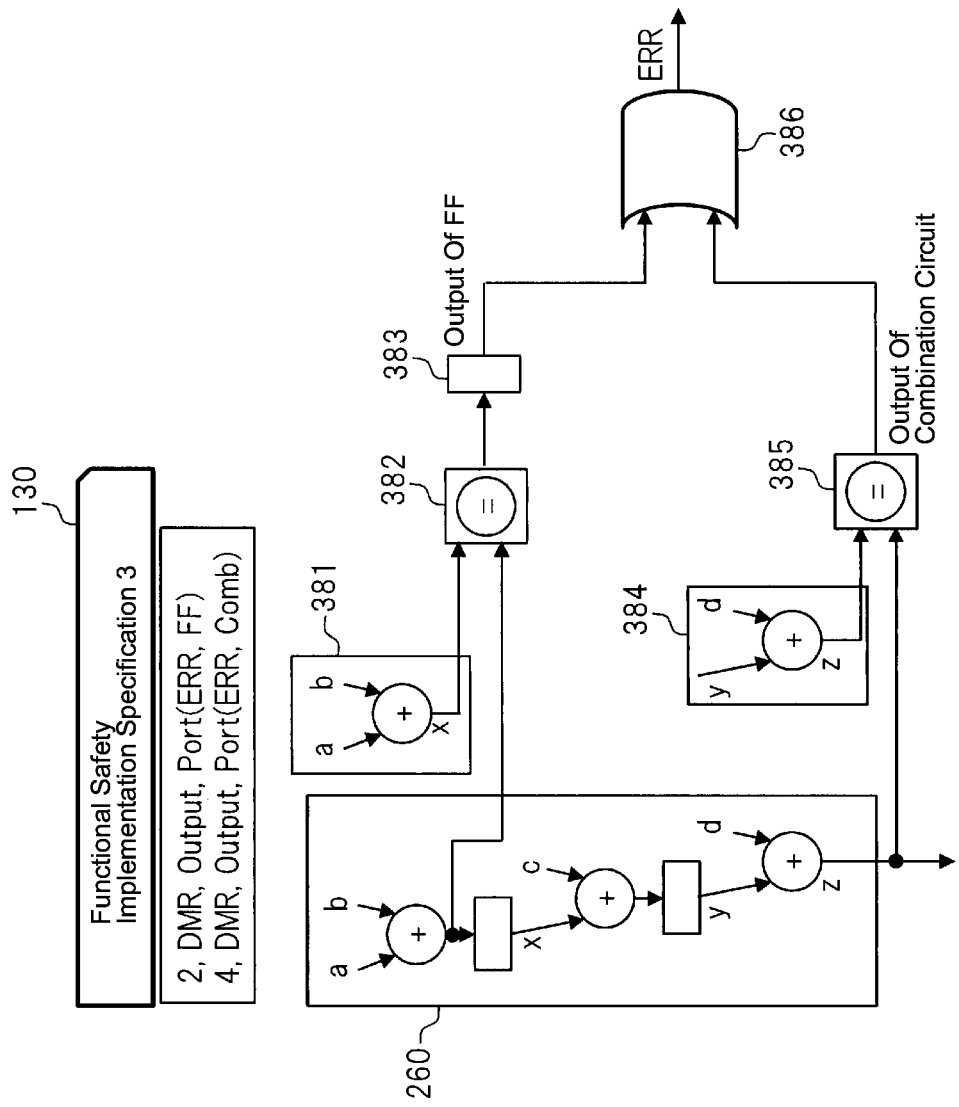
FIG. 15 is a diagram showing another example of a method of specifying an error check output signal by an output port.

FIG. 15 is a diagram showing another example of a method of specifying an error check output signal by an output port. In FIG. 15, two identical port names "ERR" are specified by the functional safety system implementation specification 130. For the line number "2" of the operation description, "F/F" is specified together with the port name "ERR". Thus, a comparator circuit 382 and a flip-flop circuit 383 are added to the circuit 381.

On the other hand, for the line number "4" of the operation description, "Comb" is specified together with the port name "ERR". Thus, a comparison circuit 385 is added to the circuit 380 in addition to the circuit 384, but a flip-flop circuit corresponding to the comparison circuit 385 is not added to the circuit 380.

Since the same port name "ERR" is specified for the line number "2" and "4" duplexing (DMR), an OR circuit 386 having the output signal of the flip-flop circuit 383 and the output signal of the comparison circuit 385 as inputs is added to the circuit 380. The OR circuit 386 notifies the outside of the logical sum of the two input signals as an error check result of the functional safety system.

Next, a case where a register name is specified will be described. When the register name is specified, logic for writing the error check result of the function safety system is connected to the function register. When the register of the specified name does not exist in the operation description, the register of the specified name is newly generated.

Figure 16:
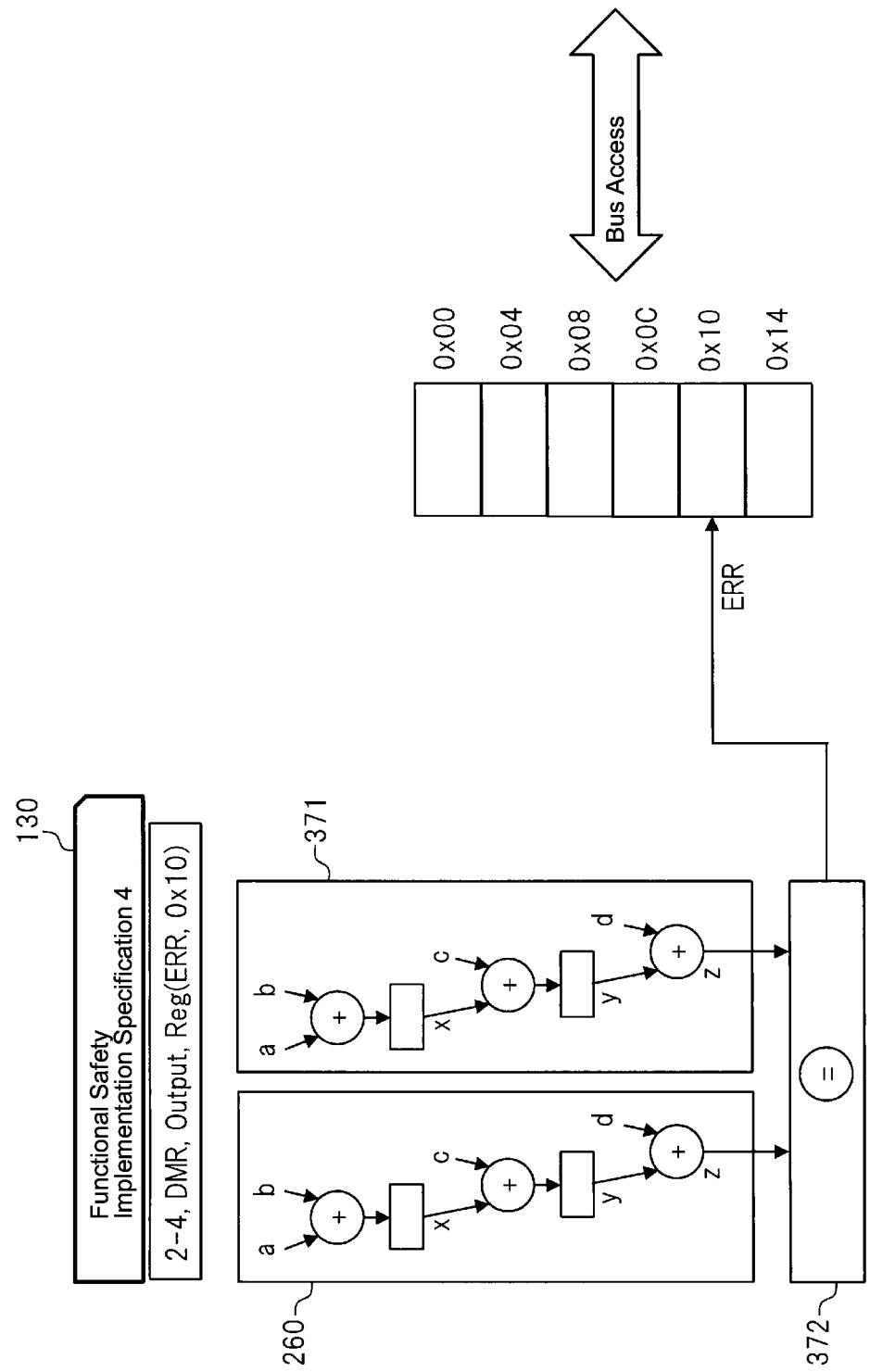
FIG. 16 is a diagram showing an example of a method of specifying a register for storing an error check output signal.

FIG. 16 is a diagram showing an example of a method of specifying a register for storing an error check output signal. In FIG. 16, the functional safety system implementation specification 130 specifies that the output signal ERR as the error check result is stored in the address "0x10" of the register space. Such designation of a register name is used when an error check result is confirmed by a function register access using a bus protocol.

In the item of "error check output signal", it is also possible to designate a combination of designation of a port name and designation of a register name. Although the error check result is overwritten in FIG. 15 and FIG. 16, a circuit that does not update the value of the error check output signal may be generated once the error is detected. In this item, the polarity (0/1) of the error check output signal may be specified.

In the items of <(5) Error check execution cycle>"Error check execution cycle", the execution cycle of error check by the functional safety system is specified. In this item, for example, the number of clock cycles, enable control, real time, and the like are specified.

Figure 17:
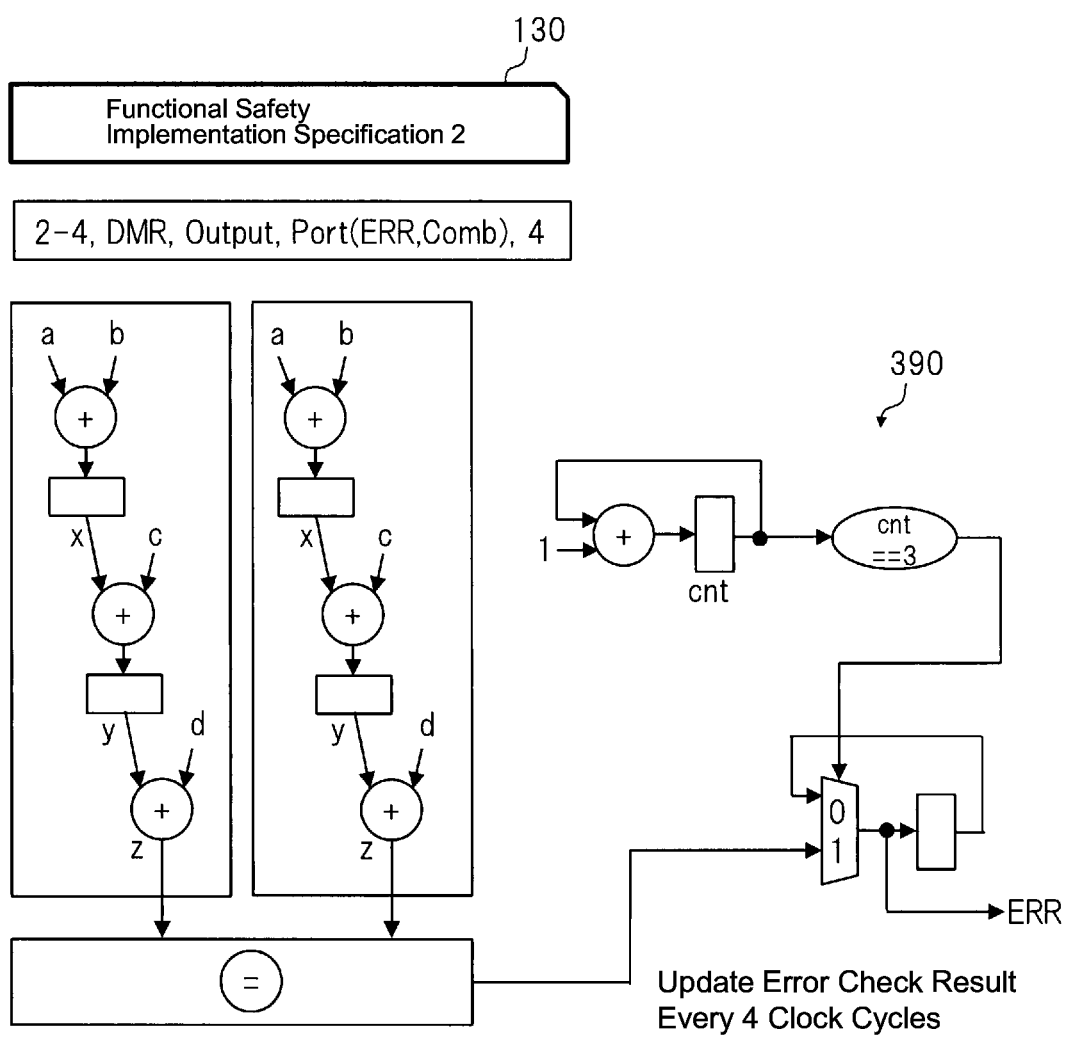
FIG. 17 is a diagram showing an example of a method of specifying an error check execution cycle by the number of clock cycles.

The "number of clock cycles" defines the number of cycles of the clock for updating the error check result. FIG. 17 is a diagram showing an example of a method of specifying an error check execution cycle by the number of clock cycles. In the functional safety system implementing specification 130 of FIG. 17, "4" is specified as the number of clock cycles. Thus, the circuit 390 shown in FIG. 17 is generated. The circuit 390 updates the error check result every four cycles and notifies it to the outside.

The "enable control" specifies that the error check is executed only when the specified enable condition is satisfied. In the designation of the enable control, for example, an FSM generated by high-level synthesis, an internal signal, or the like may be used.

The "real time" defines the update time of the error check result. Since the high-level synthesis script describes the constraint of the operating frequency (clock period), it is possible to convert the specified real time into the number of clock cycles. The same treatment as the "number of clock cycles" described above is performed on the converted number of clock cycles. For example, when 40 ns is specified as the error check execution cycle and 10 ns is specified as the constraint of the clock cycle by the high-level synthesis script, a circuit similar to that of FIG. 17 is generated, for example.

In addition, real-time specification using the FTTI (Fault Tolerant Time Interval of the functional safety analytical result) can also be performed. For example, in the present embodiment, a FTTI time or the like offsetting the time (FTTI-10 ns) of ½ of the FTTI can be specified as the real time.

It is also possible to specify an error check execution cycle in which two or more of these are combined. For example, it is also possible to specify that "an error check is performed every four clock cycles after the enablement condition specified by the enablement control is satisfied" or the like.

In the item <<(6) Functional Safety System Module Name>"Functional Safety System Module Name", the module name of the functional safety system to be inserted is specified. For example, for the circuit of the function safety system, designations for giving special constraints to each of the EDA tools executed after the generation of the RTL description, such as designations for not disappearing by optimization of the logic synthesis, designations for arranging the circuit in an area different from the original function in the layout, and the like, are performed by using the module names.

Figure 18:
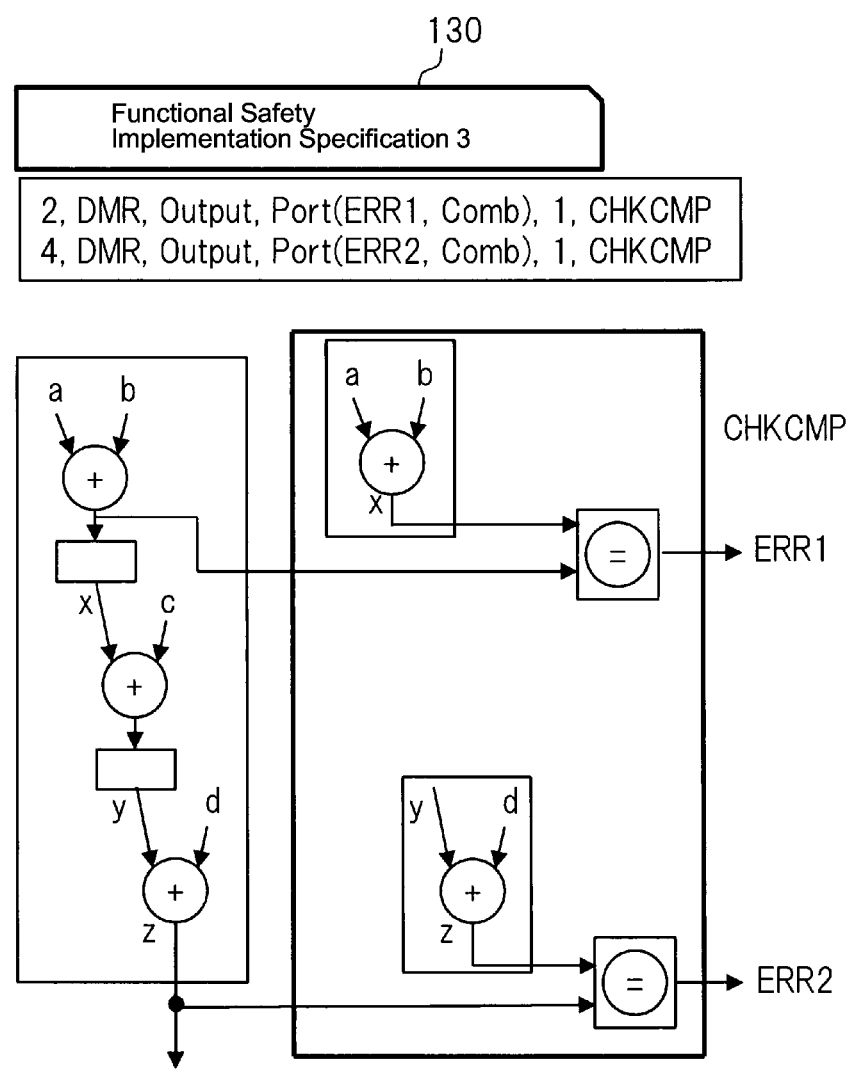
FIG. 18 is a diagram showing an example of a method of designating by the function safety system module name.

FIG. 18 is a diagram showing an example of a method of designating by the function safety system module name. In FIG. 18, two functional safety systems specified in the functional safety system implementing specifications 130 are generated in the same CHKCMP. In a functional safety system in which a plurality of types of circuits are generated, a module name may be specified for each circuit. For example, in the case of a duplexing circuit, an output module name may be specified for each of the redundancy circuit and the comparison circuit. It is also possible that the circuitry of the functional safety system is generated outside the functional module from which the high-level synthesis is generated. In this case, the high-level synthesis generates the original functional module and the functional safety system module, and also generates the high-level module connecting them.

Figure 19:
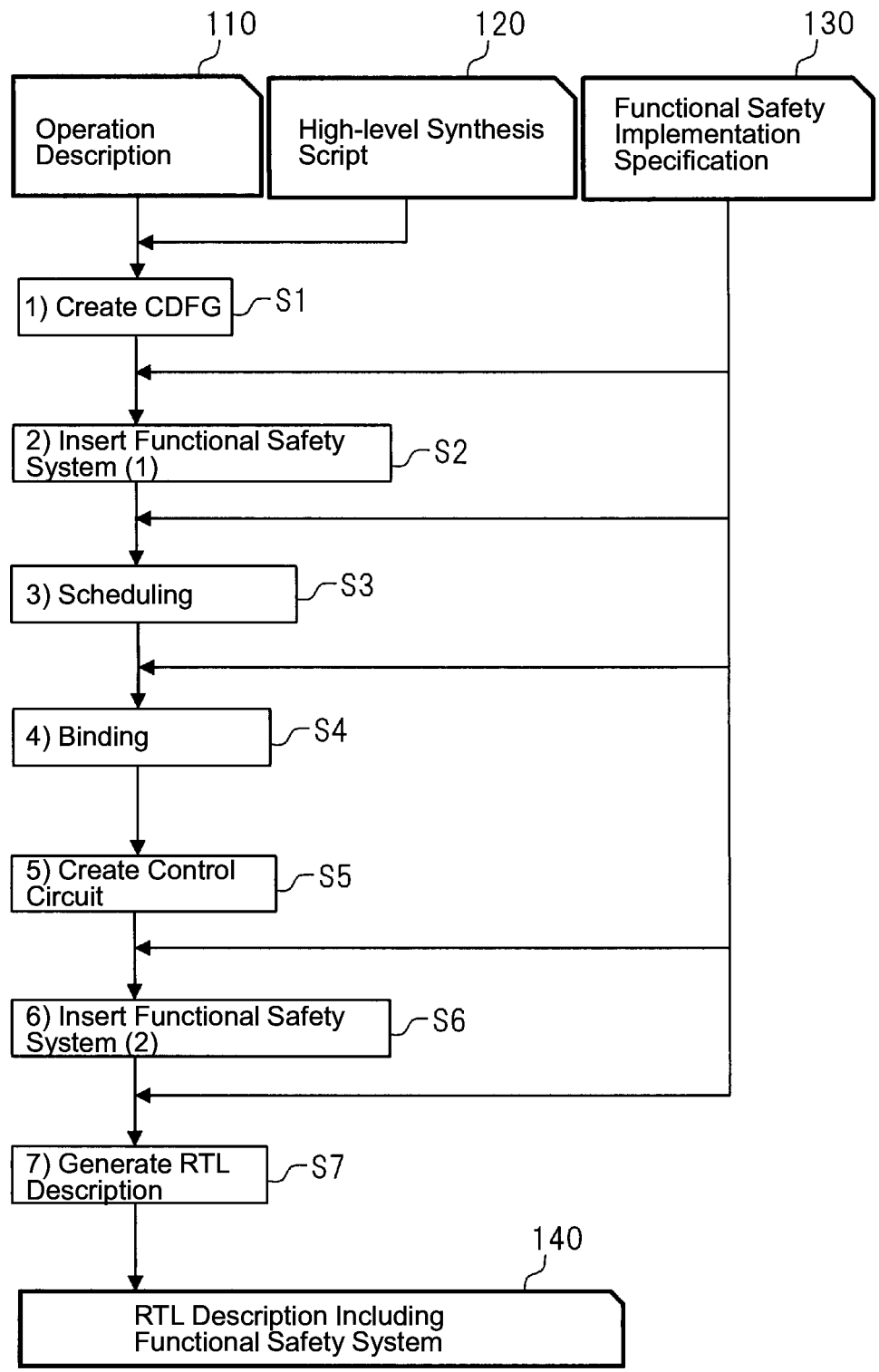
FIG. 19 is an explanatory diagram showing an example of a high-level synthesis method according to Embodiment 1 of the present invention.
Figure 20:
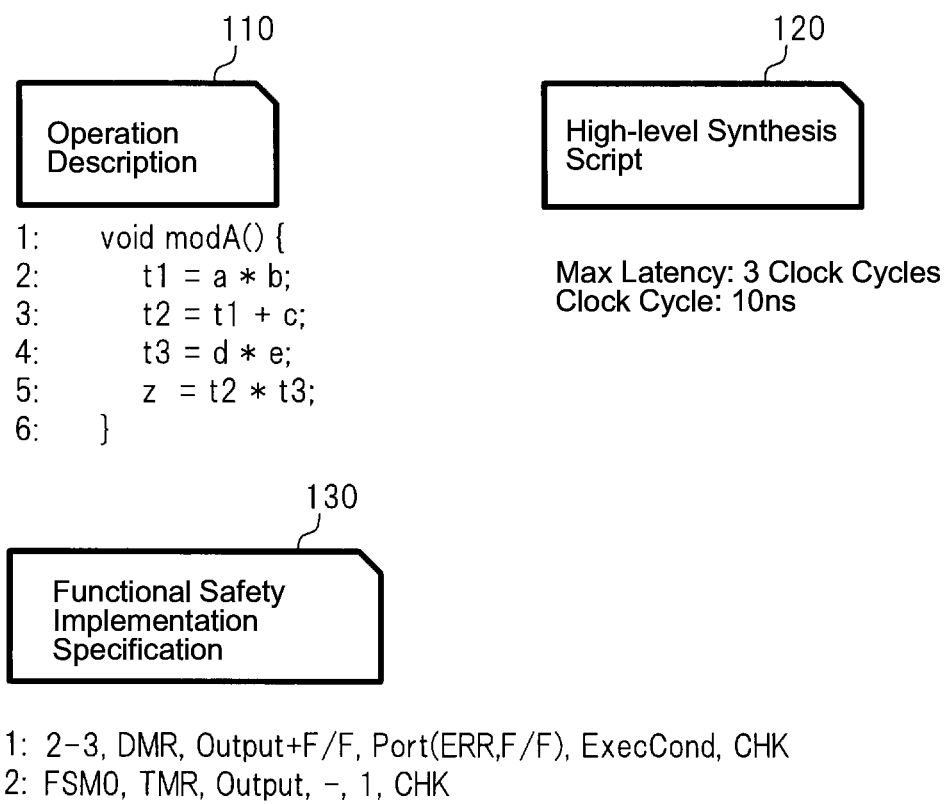
FIG. 20 is a diagram illustrating an operation description, a high-level synthesis script, and a functional safety system implementation specification for explaining the high-level synthesis method.

Next, a high-level synthesis method for generating an RTL description implementing an arbitrary functional safety system will be described in detail. FIG. 19 is an explanatory diagram showing an example of a high-level synthesis method according to Embodiment 1 of the present invention. FIG. 20 is a diagram illustrating an operation description, a high-level synthesis script, and a functional safety system implementation specification for explaining the high-level synthesis method. Hereinafter, the high-level synthesis method will be described with reference to FIG. 20.

As shown in FIG. 19, in the high-level composition of the present embodiment, the processes of CDFG creation S1, function safety system insertion (1) S2, scheduling S3, binding S4, control circuit creation S5, function safety system insertion (2) S6, and RTL description generation S7 are executed. First, the user creates respective files of the operation description 110, the high-level synthesis script 120, and the function safety system implementation specification 130 shown in FIG. 20, and transfers them to the high-level synthesis apparatus 1.

The operation description 110 is described in a general program language. In the high-level synthesis script 120, a high-level synthesis constraint of a clock period of 10 ns and a maximum latency of 3 clock cycles is specified.

The Functional Safety System Implementation Specification 130 specifies two Functional Safety Systems. In the first line, a duplexing circuit (one redundancy circuit and a comparison circuit) is designated to be implemented for the circuit that realizes the second-third line of the operation description 110. In the first line, "Output +F/F" is specified as the error check input signal. Therefore, the output signal t2 of the second-third row of the operation description 110 and the output signal of the register generated by the high-level synthesis result become the input signal of the comparison circuit. In the first row, the output signal of the flip-flop circuit is designated as the error check output signal. The flip-flop circuit generates and outputs an error check output signal "ERR". In the first line, "ExecCond" is specified as the error check cycle. Therefore, the flip-flop circuit outputs the error check result only in the cycle in which the value of the error check input signal is updated.

The second line of the Functional Safety System Implementation Specifications 130 specifies that a triplexing circuit (two redundant circuits and a majority voting circuit) be implemented for the control circuit FSM0 generated by the high-level combination. In this example, it is assumed that the error check result is not notified to the outside in order to implement the triplexing circuit. Therefore, "-" is specified in the error check output signal in the second line. The number of clock cycles "1" is specified in the error check execution cycle. Therefore, the error check by the majority circuit is performed every clock cycle. The function safety system module name "CHK" is specified in each designation on line 1-2. Thus, both functional safety systems are generated in the module CHK.

Figure 21:
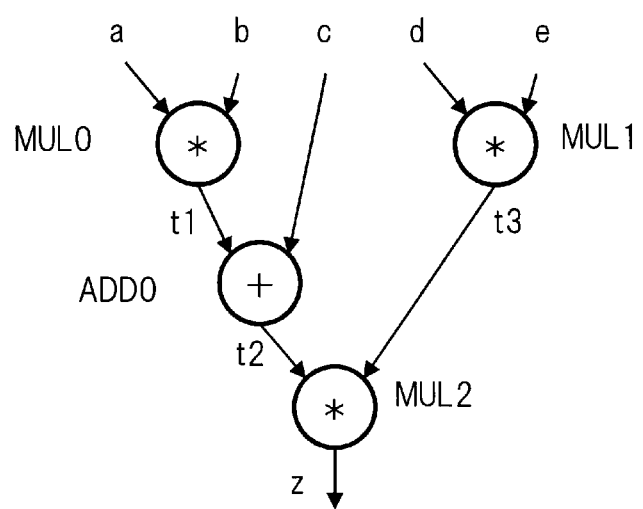
FIG. 21 is a diagram illustrating an exemplary CDFG.

In the CDFG creation S1, a CDFG is created by inputting the operation description 110. More specifically, after optimizing the redundancy logic in the operation description 110, the high-level synthesizing unit 50 extracts a control flow and a data flow and creates a CDFG. FIG. 21 is a diagram illustrating an exemplary CDFG. In FIG. 21, the MUL0 corresponds to the second line of the operation description 110. The ADD0, MUL1, MUL2 corresponds to the third and fifth lines of the operation description 110, respectively.

In the functional safety system insertion (1) S2, the functional safety system logic is inserted into the CDFG in accordance with the functional safety system implementing specification 130. More specifically, the high-level synthesizing unit 50 inserts the function safety system logic for the operation description position (line 2-3) specified in the function safety system implementation specification 130.

In high-level compositing, redundant logics are deleted when creating a CDFG from the behavioral description 110. In other words, the logic is optimized. Therefore, the functional safety system logic is necessarily inserted as the redundant logic according to the operation description position after the CDFG creation S1. This ensures that the functional safety logic to be inserted is not deleted in the CDFG. In the present case, the insertion of the functional safety logic according to the behavioral description location is carried out after the CDFG creation S1 and prior to the scheduling S3. This is because the execution cycle of the operation to be inserted as the functional safety system and the optimization of the hardware resource to be used can be most easily implemented.

Figure 22:
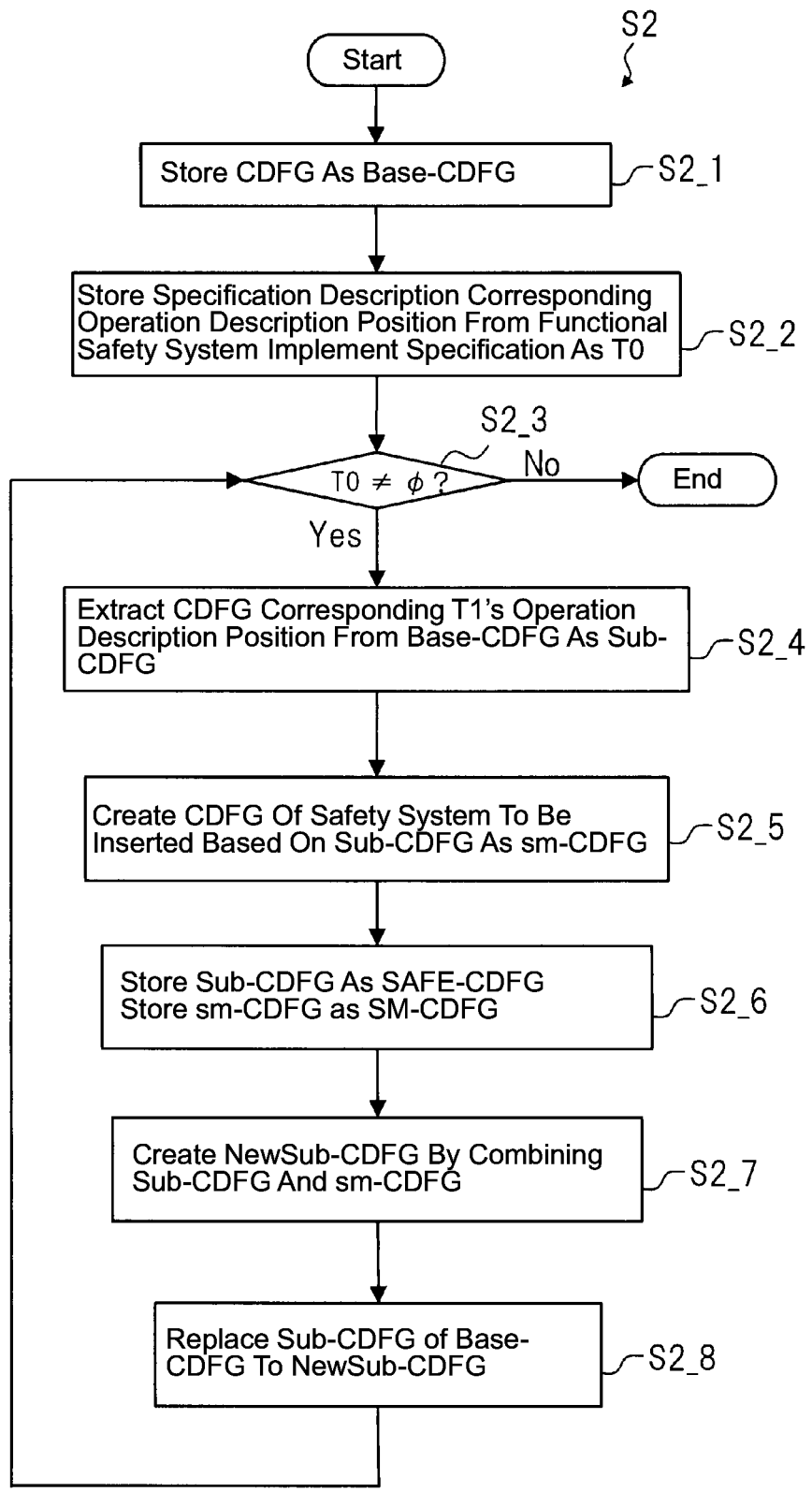
FIG. 22 is a flow diagram illustrating an example of functional safety system insertion (1).

FIG. 22 is a flow diagram illustrating an example of functional safety system insertion (1). As shown in FIG. 22, the functional safety system insertion (1) S2 includes steps S2_1 to S2_8. In step S2_1, the high-level synthesizing unit 50 stores the CDFG generated in the CDFG creation S1 as a Base-CDFG in the data storage unit 40 of FIG. 1.

In step S2_2, the high-level synthesizing unit 50 extracts only the description of the implementing specification for the operation description position from the functional safety system implementing specification. In this example, the high-level synthesizing unit 50 extracts the description on the implementing specification for the second-third line of the operation description 110 in the first line of the functional safety system implementing specification 130 of FIG. 20, and stores the extracted portion in the data storage unit 40 as the extraction description T0.

In step S2_3, the high-level synthesizing unit 50 determines whether or not the extraction description T0 is empty ($\varphi$). If it is determined that the extracted description T0 is not empty (Yes), the high-level synthesizing unit 50 extracts the implementation specification from the extracted description T0. Then, the treatment of the subsequent step S2_4 is executed.

On the other hand, when judging that the extraction description T0 is empty ($\varphi$) (No), the high-level synthesizing unit 50 ends the processing of the function safety system insertion (1) S2.

In this example, in the immediately preceding step S2_2, the description regarding the implementation specification for the second-third line is extracted. Therefore, the high-level synthesizing unit 50 extracts the implementation specification for the second-third line of the operation description 110 from the extraction description T0 as the specification T1.

In step S2_4, the high-level synthesizing unit 50 extracts the CDFG corresponding to the operation description position of the specification T1 from the Base-CDFG, and stores the extracted CDFG as a Sub-CDFG in the data storage unit 40. In this embodiment, the vertexes MUL0, ADD0 and the sides a, b, c, t1, and t2 corresponding to the second-third line are extracted from the operation description position specified by the specification T1, and the Sub-CDFG including the vertexes is generated and stored.

In step S2_5, the high-level synthesizing unit 50 creates the CDFG of the function safety systems to be inserted as a sm-CDFG based on the Sub-CDFG. In this embodiment, since the functional safety system specified in the specification T1 is a duplexing circuit, the high-level synthesizing unit 50 creates a redundancy calculation and comparing circuit for the Sub-CDFG created in the specification T 2_4.

Figure 23:
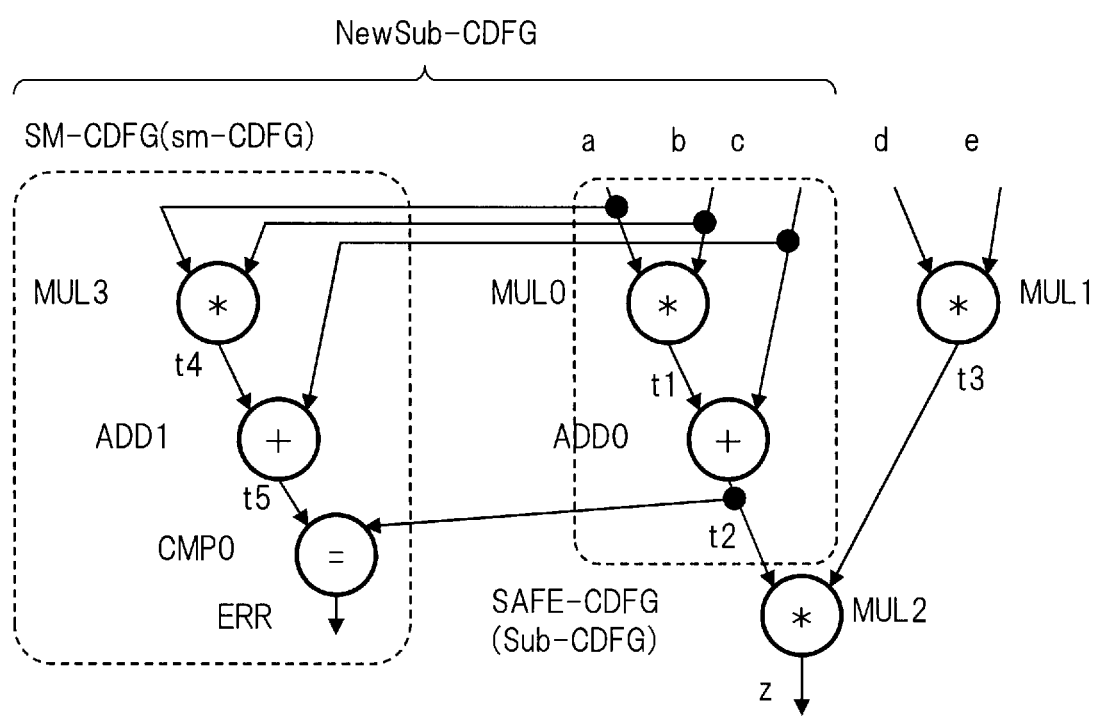
FIG. 23 is a diagram illustrating an exemplary sm-CDFG.

FIG. 23 is a diagram illustrating an exemplary sm-CDFG. In FIG. 23, vertices MUL3, ADD1, CMP0, sides a, b, c, t4, t5, and ERRs are created as redundancy calculator and comparison circuits. Then, a CDFG including these is created as a sm-CDFG. Since the port name ERR is specified as the error check output signal in the specification T1, the output side of the CMP0 is the ERR.

In step S2_6, the high-level synthesizing unit 50 stores the Sub-CDFG created in step S2_4 as a SAFE-CDFG in the data storage unit 40. The high-level synthesizing unit 50 stores the sm-CDFG generated in step S2_5 in the data storage unit 40 as a SM-CDFG. The SAFE-CDFG and the SM-CDFG are used in scheduling S3, which will be described later.

In step S2_7, the high-level synthesizing unit 50 merges the Sub-CDFG and the sm-CDFG, and creates a NewSub-CDFG as a new Sub-CDFG. The NewSub-CDFG of FIG. 23 includes vertices MUL0, MUL1, MUL3, ADD0, ADD1 and sides a, b, c, t1, t2, t4, and t5.

In step S2_8, the high-level synthesizing unit 50 replaces the portion corresponding to the Sub-CDFG with the New-Sub-CDFG created in step S2_7 for the Base-CDFG, and creates a Base-CDFG in which the function safety systems are inserted.

Then, the process returns to step S2_3. However, since the specification T1 is extracted from the extraction description T0 in the previous step S2_3, the extraction description T0 is empty (T0=$\varphi$). Therefore, in step S2_3 this time, the high-level synthesizing unit 50 determines that the extraction description T0 is empty ($\varphi$) (No), and ends the processing of the function safety system insertion (1) S2.

Figure 24:
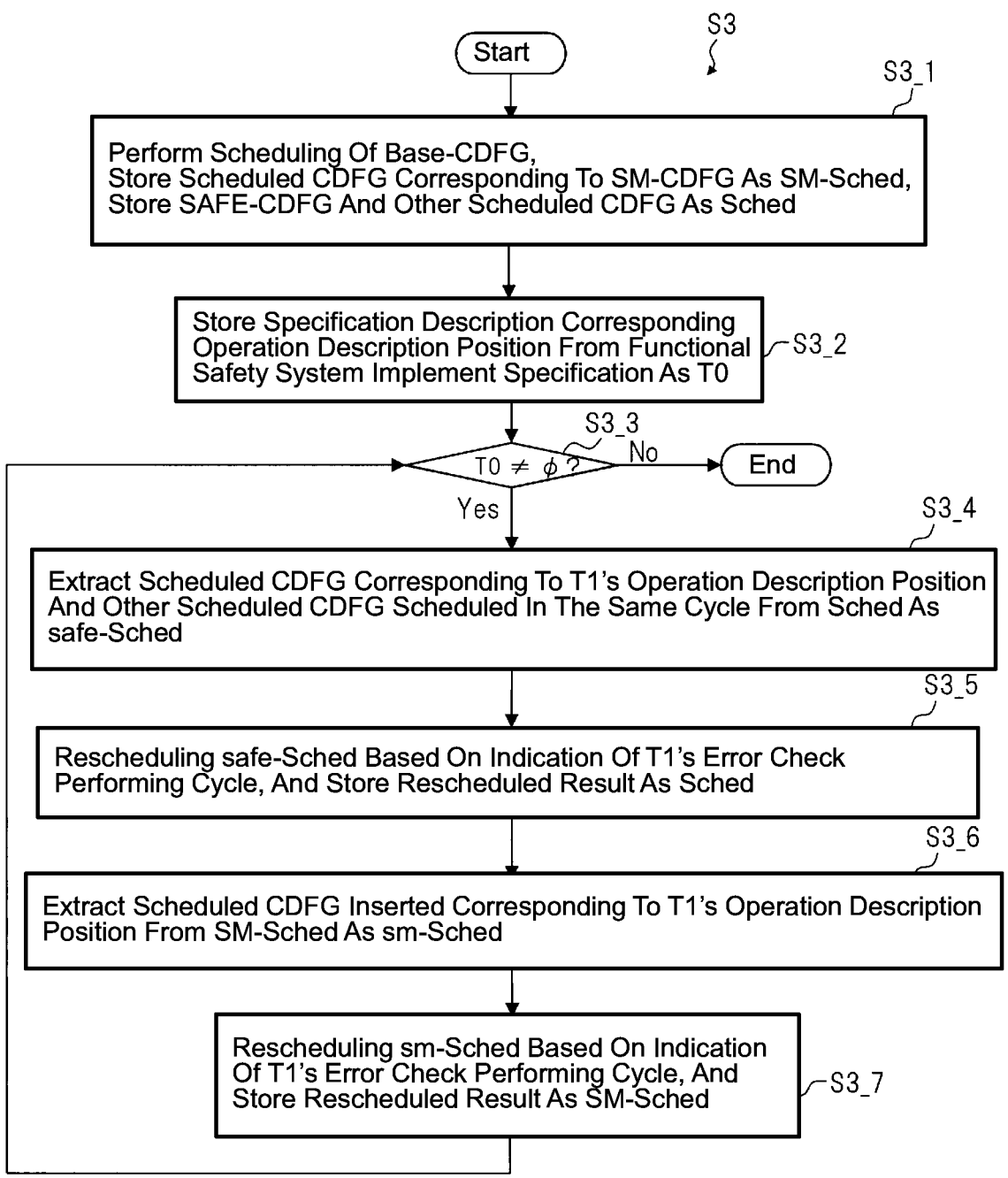
FIG. 24 is a flow diagram showing an example of scheduling.

Next, the scheduling S3 will be described. In scheduling, for example, the execution cycle of the operation is determined based on the constraint specified by the high-level synthesis script 120. Here, it is assumed that the CDFG of FIG. 23 is inputted. FIG. 24 is a flow diagram showing an example of scheduling. The scheduling S3 of FIG. 24 includes steps S3_1 to S3_7.

In operation S3_1, the high-level synthesizing unit 50 schedules the Base-CDFG. For example, the high-level synthesizing unit 50 determines the execution cycle of the Base-CDFG including the operation of the function safety system added in the function safety system inserting (1) S2.

More specifically, the high-level synthesizing unit 50 inserts a clock cycle boundary at the clock period 10 ns specified in the high-level synthesizing script 120. In this example, the delay in each calculator is estimated to be 8 ns in the multiplier, 4 ns in the addition, and 2 ns in the comparison operation.

The ring-level synthesizing unit 50 schedules the SM-CDFG stored in the data storage unit 40 using the estimation result of the delay times. Then, the high-level synthesizing unit 50 stores the scheduled CDFG corresponding to the SM-CDFG as a SM-Sched in the data storage unit 40. The high-level synthesizing unit 50 also schedules SAFE-CDFG and other CDFG stored in the data storage unit 40. The high-level synthesizing unit 50 stores the scheduled CDFG in the data storage unit 40 as a Sched.

In step S3_2, the high-level synthesizing unit 50 extracts only the implementing specification for the operation description position from the functional safety system implementing specification 130. Step S3_2 is the same as step S2_2 in FIG. 22. The high-level synthesizing unit 50 stores the extraction description T0 in the data storage unit 40.

In step S3_3, the high-level synthesizing unit 50 determines whether or not the extraction description T0 is empty (φ). Step S3_3 is similar to step S2_3. When it is determined that the extraction description T0 is not empty (Yes), the high-level synthesizing unit 50 extracts the implementation specification (specification T1) from the extraction description T0. Then, the processing of the subsequent step S3_4 is executed.

On the other hand, when the high-level combining unit 50 determines that the extraction description T0 is empty (p) (No), the high-level combining unit 50 ends the processing of the scheduling S3.

In operation S3_4, the high-level synthesizing unit 50 extracts the scheduled CDFG corresponding to the second-third line and the other scheduled CDFG scheduled in the same cycle from the Sched as a safe-Sched from the operation description position specified in the specification T1.

In operation S3_5, the high-level synthesizing unit 50 reschedules the safe-Sched in accordance with the designated error check cycle.

The high-level synthesizing unit 50 grasps the execution condition of each calculator. Therefore, when the execution condition of the operation of the function safety system implementing target matches the condition of the error check execution cycle, even if the arithmetic unit is shared between the operation of the function safety system implementing object and the other operations, the error check result is not affected. That is, in the case of this example, there is no occurrence of a mismatch between the calculation result of the functional safety system implementing target and the calculation result of the functional safety system.

In this embodiment, "ExecCond" indicating the execution time of an operation is specified in the error check execution cycle specified in the specification T1 as shown in FIG. 20. Therefore, the high-level synthesizing unit 50 searches for the possibility of sharing the arithmetic unit with respect to the arithmetic operation included in the safe-Sched as long as three clock cycles of the highest latency are satisfied.

Figure 25:
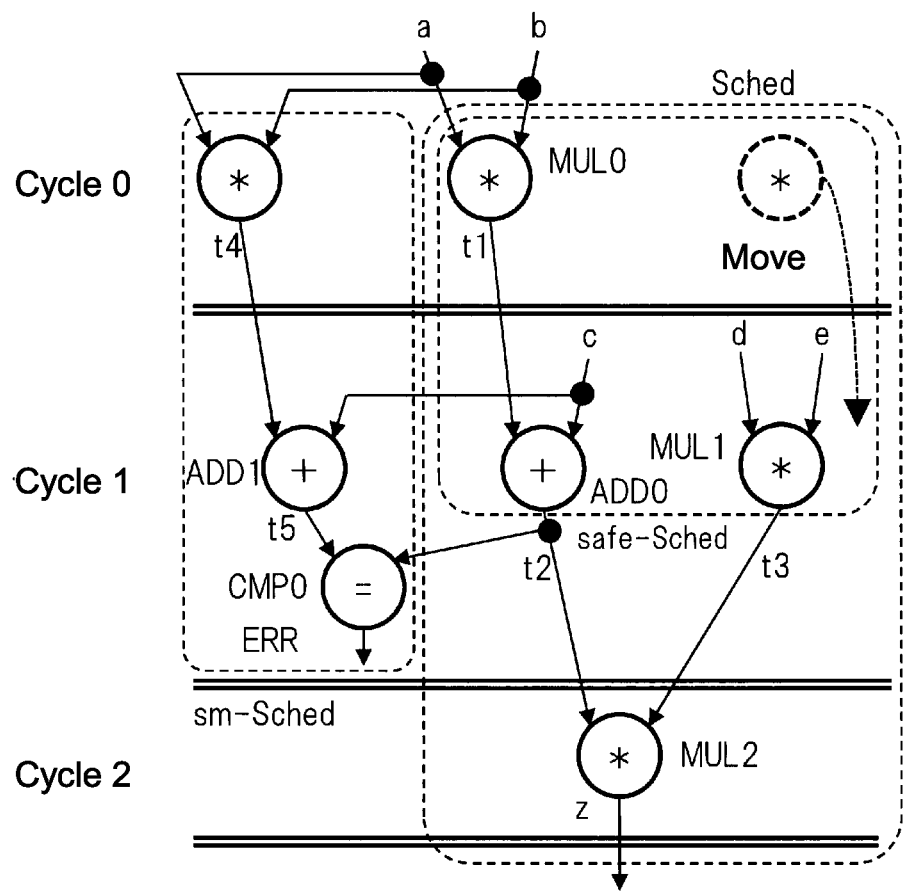
FIG. 25 is a diagram illustrating a rescheduling process for a safe-Sched.

FIG. 25 is a diagram for explaining how to schedule a safe-Sched. FIG. 25 corresponds to the CDFG of FIG. 23. As shown in FIG. 25, two multipliers are required if two multiplications MUL0 and MUL1 are to be performed on the safe-Sched in cycles 0. On the other hand, the operation of cycle 1 does not include multiplication. Therefore, the high-level synthesizing unit 50 moves the multiplier MUL1 from cycle 0 to cycle 1. This results in one multiplication for each cycle, so that the multiplication for all cycles can be performed in one multiplier. The high-level synthesizing unit 50 updates the Sched stored in the data storage unit 40 by using the rescheduling result.

In operation S3_6, the high-level synthesizing unit 50 retrieves the scheduled CDFG of the function safety systems inserted into the operation description position specified in the specification T1 from the SM-Sched. The extracted CDFG is sm-Sched.

In operation S3_7, the high-level synthesizing unit 50 reschedules the sm-Sched step on the error check cycle specified in the specification T1, and stores the rescheduled CDFG in the data storage unit 40 as a new sm-Sched. In the case of FIG. 25, the sm-Sched calculator MUL3 and ADD1 cannot be moved. Therefore, the rescheduling result for the sm-Sched calculator is the same as the result of step S3_1.

Then, the process returns to step S3_3. However, since the specification T1 is extracted from the extraction description T0 in the previous step S3_3, the extraction description T0 is empty (T0=φ). Therefore, in this step S3_3, the high-level synthesizing unit 50 determines that the extraction description T0 is empty (φ) (No), and the treatment of the scheduling S3 ends.

Next, the binding S4 will be described. In the binding S4, binding is performed based on the scheduling result in the scheduling S3. For example, in the binding S4, the scheduling result in the scheduling S3 is used to map an arithmetic unit, a register, or the like to the data path. Here, the scheduled CDFG shown in FIG. 25 is inputted.

Figure 26:
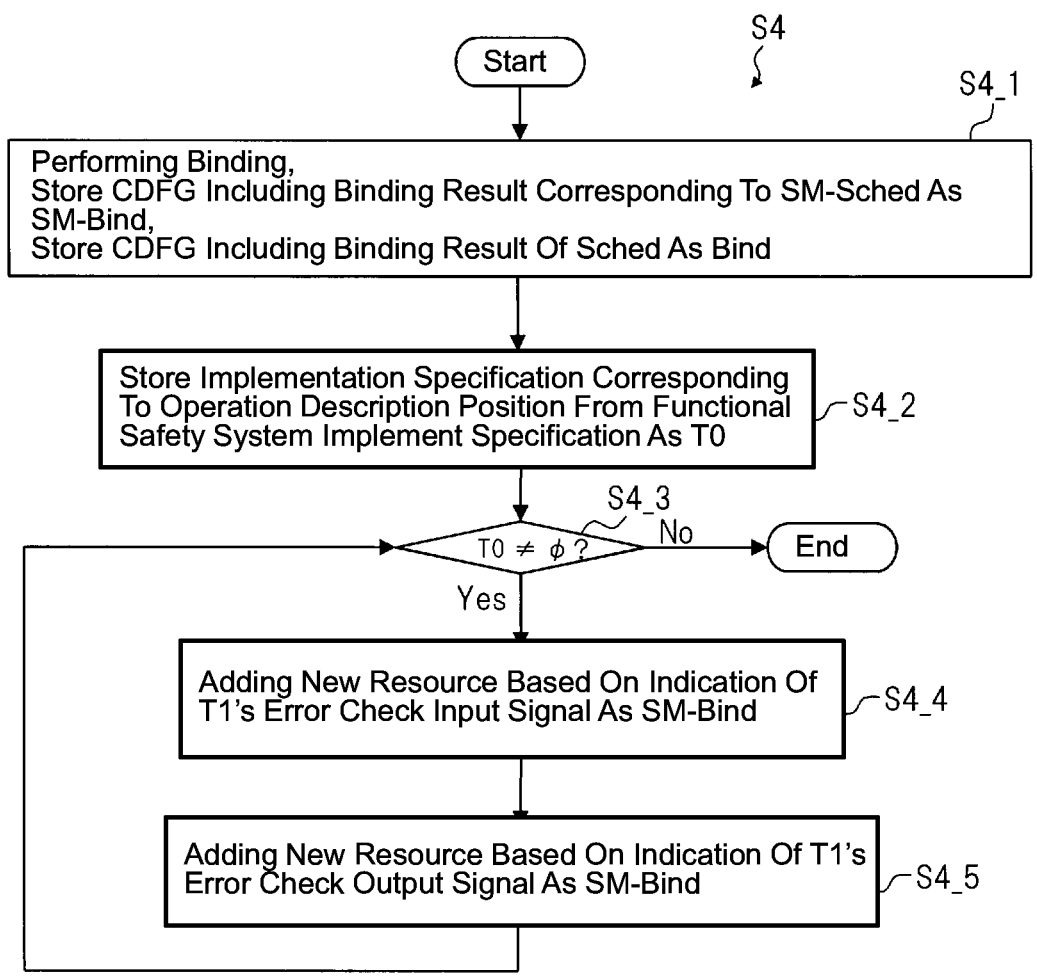
FIG. 26 is a flow diagram illustrating an example of binding.
Figure 27:
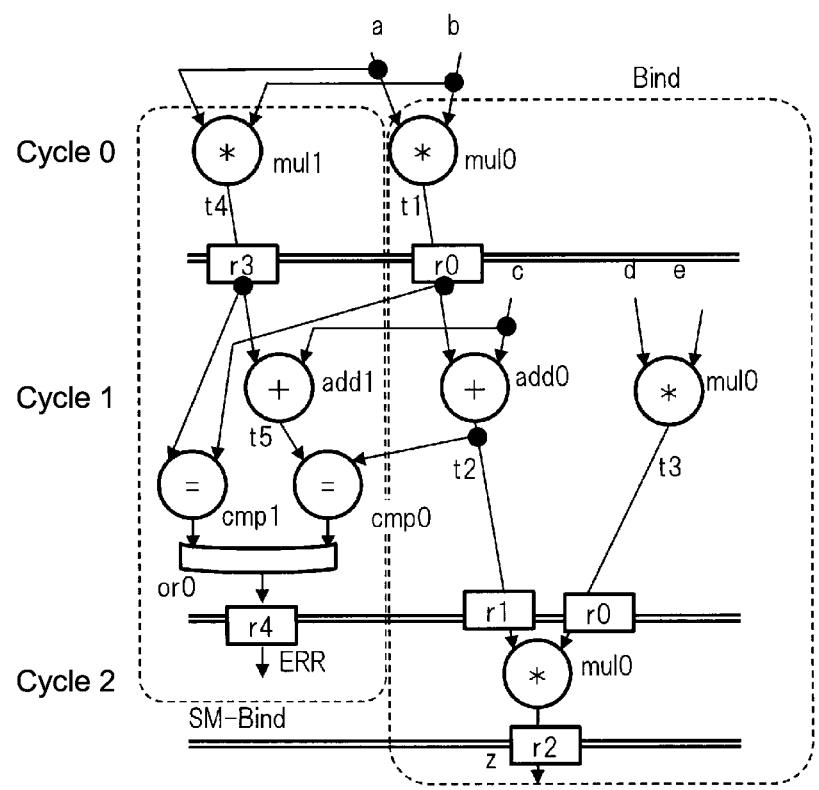
FIG. 27 is a flow diagram illustrating a binding method.

FIG. 26 is a flow diagram illustrating an example of binding. The binding S4 of FIG. 26 includes steps S4_1 to S4_5. FIG. 27 is a diagram for explaining the binding method.

In step S4_1, the high-level synthesizing unit 50 maps the CDFG included in the SM-sched updated in the scheduling S3. More specifically, as shown in FIG. 27, the high-level synthesizing unit 50 maps the mul1 to the multiplier, the add1 to the addition, and the cmp0 to the comparing operation. Then, the high-level synthesizing unit 50 stores the CDFG with the mapping result as a SM-Bind in the data storage unit 40. In addition, the high-level synthesizing unit 50 maps the register r3 to the data path crossing the clock boundary, and stores the CDFG including the mapping result of the register r3 as a SM-Bind.

Although not applicable in this example, resource sharing may be performed between operations within the functional safety system. However, the resource sharing is performed on the condition that no inconsistency occurs in the comparison operation even though there is no hardware failure in accordance with the designated error check execution cycle.

Subsequently, the high-level synthesizing unit 50 maps the Sched to the CDFG created in the scheduling S3. More specifically, the high-level synthesizing unit 50 maps mul0 to multiplications and add0 to additions. This is because only the mul0 is mapped to the multiplication because the Sched multiplication can be handled by one multiplier by the scheduling S3.

Then, the high-level synthesizing unit 50 stores the CDFG with the mapping result for the Sched as a Bind in the data storage unit 40. The high-level synthesizing unit 50 maps the registers r0, r1, and r2 to data paths crossing clock boundaries, respectively, and stores CDFG including the mapping results as a Bind. The reason why the register r2 is mapped to the mul0 output paths of cycles 2 is to output the values of z to the outside at all times.

The Bind, SM-Bind created here is used in RTL description generation S7, which will be described later.

In step S4_2, the high-level synthesizing unit 50 extracts only the implementing specification for the operation description position from the functional safety system implementing specification 130. Step S4_2 is the same as step S3_2 and the like in FIG. 24. The high-level synthesizing unit 50 stores the extraction description T0 in the data storage unit 40.

In step S4_3, the high-level synthesizing unit 50 determines whether or not the extraction description T0 is empty ($\varphi$). Step S4_3 is similar to step S3_3 and the like. When it is determined that the extraction description T0 is not empty (Yes), the high-level synthesizing unit 50 extracts the implementation specification (specification T1) from the extraction description T0. Then, the processing of the subsequent step S4_4 is executed. On the other hand, when determining that the extraction description T0 is empty ($\varphi$) (No), the high-level combining unit 50 ends the processing of the binding S4.

In step S4_4, a new resource is added based on the error check input signal specified in the specification T1. More specifically, as shown in FIG. 20, "Output +F/F" is specified as the error check input signal. Therefore, in addition to the Output values t2 and t5, the values of the register r0 and the register r3 that straddle the cycle 0 and the cycle 1 are also error check input signals, and therefore resources for performing these error checks are added. More specifically, the high-level synthesizing unit 50 adds a or0 for outputting the logical sum of the error check results in the cmp1, cmp0 and the cmp1 for comparing the values of the registers r0 and r3, respectively, and stores the CDFG including the mapped results as a SM-Bind.

In step S4_5, a new resource is added based on the error check output signal specified in the specification T1. Specifically, as shown in FIG. 20, "Port (ERR, F/F)" is specified as the error check output signal. Therefore, the high-level synthesizing unit 50 adds the register r4 between the ERR and the or0, and stores the CDFG including the result of mapping the register r4 as a SM-Bind.

Then, the process returns to step S4_3. However, since the specification T1 is extracted from the extraction description T0 in the previous step S4_3, the extraction description T0 is empty (T0=$\varphi$). Therefore, in this step S4_3, the high-level synthesizing unit 50 determines that the extraction description T0 is empty ($\varphi$) (No), and the processing of the binding S4 ends.

Figure 28:
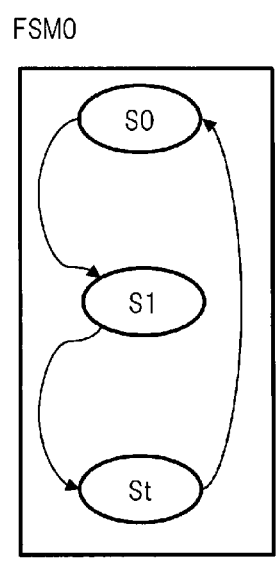
FIG. 28 is a diagram showing an example of a control circuit for controlling an operation in each cycle.

<Control Circuit Creation>> Next, control Circuit Creation S5 is explained. In the control circuit creation S5, a control circuit for controlling the operation in each cycle determined by the scheduling result is generated. FIG. 28 is a diagram showing an example of a control circuit for controlling an operation in each cycle. The high-level synthesizing unit 50 generates a control circuit FSM0 having three states St0, St1, St2 in order to sequentially execute the operations of cycle 0, cycle 1, and cycle 2 shown in FIG. 27 and the like. The control circuitry FSM0 is configured to, for example, perform the operation of cycle 0 when in state St0, perform the operation of cycle 1 when in state St1, and perform the operation of cycle 2 when in state St2.

Next, the functional safety system insertion (2) S6 will be described. In the functional safety system insertion (2) S6, a functional safety system circuit targeted for the control circuit generated in the control circuit creation S5 is inserted in accordance with the functional safety system implementing specification 130.

Figure 29:
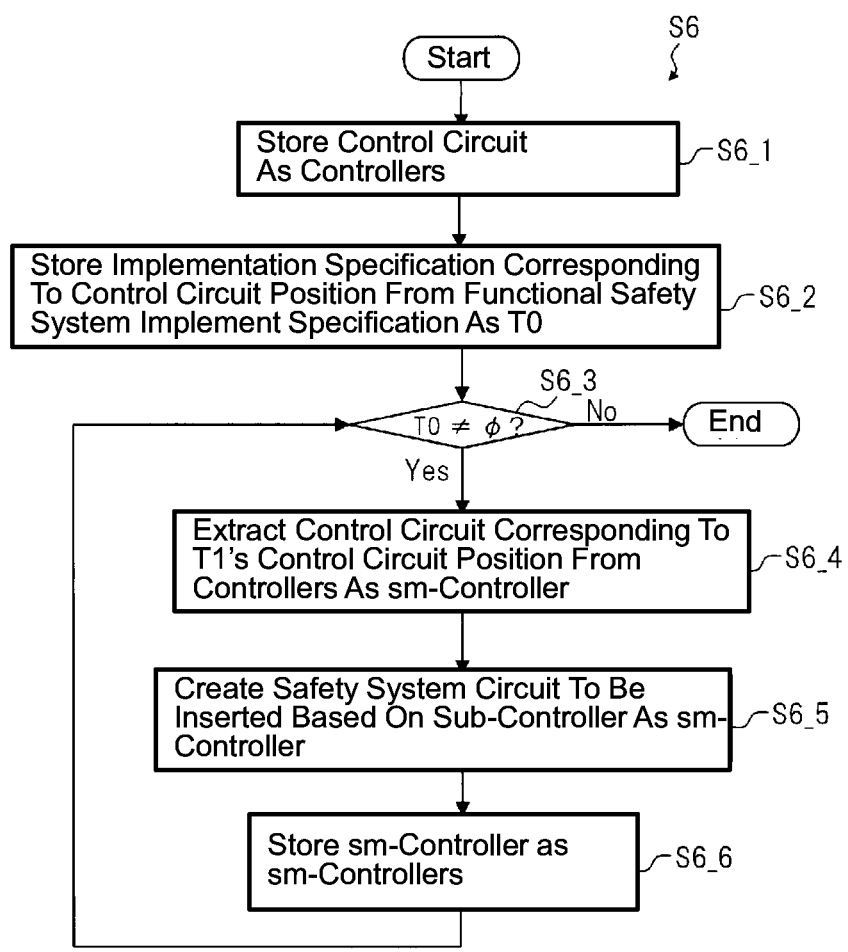
FIG. 29 is a flow diagram illustrating an example of functional safety system insertion (2).
Figure 30:
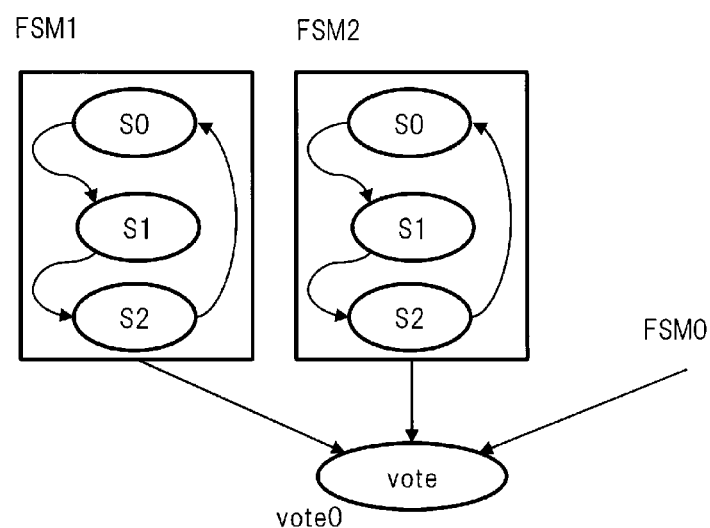
FIG. 30 is a diagram showing an example of the functional safety system inserted in the functional safety system insertion (2).

In the high-level synthesis, the control circuit is generated after execution of the binding S4. For this reason, the insertion of the functional safety system circuit for the control circuit generated by the high-level synthesis is always performed after the creation of the control circuit S5. FIG. 29 is a flow diagram illustrating an example of functional safety system insertion (2). The functional safety system insertion (2) S6 of FIG. 29 includes steps S6_1 to S6_6. FIG. 30 is a diagram showing an example of the functional safety system inserted in the functional safety system insertion (2). In the following, the flow of inserting the functional safety system (2) S6 will be described with the control circuit FSM0 shown in FIG. 28 as an input.

In step S6_1, the high-level synthesizing unit 50 stores the control circuit FSM0 generated in the control circuit creation step S5 as a Controllers in the data storage unit 40. The stored control-circuit FSM0 is used in RTL-description creation S7, which will be described later.

In step S6_2, only the part of the implementing specification for the high-level synthesis control circuit is extracted from the functional safety system implementing specification. For example, the high-level synthesizing unit 50 extracts the implementing specification for the control circuit FSM0 of the second row from the functional safety system implementing specification 130 of FIG. 20. The high-level synthesizing unit 50 stores the extracted portion in the data storage unit 40 as the extraction description T0.

In step S6_3, the high-level synthesizing unit 50 determines whether or not the extraction description T0 is empty ($\varphi$). Step S6_3 is similar to step S2_3 and the like. When it is determined that the extraction description T0 is not empty (Yes), the high-level synthesizing unit 50 extracts the implementation specification (specification T1) from the extraction description T0. Then, the treatment of the subsequent step S6_4 is executed.

On the other hand, when determining that the extraction description T0 is empty ($\varphi$) (No), the high-level combining unit 50 terminates the process of the function safety system insertion (2) S6.

In operation S6_4, the high-level synthesizing unit 50 extracts a control circuit FSM0 corresponding to the high-level synthesizing control circuit specified in the specification T1 from the Controllers. It should be noted that the extracted control circuit (FSM0) is a Sub-Controller circuit.

In S6_5, the high-level synthesizing unit 50 creates a functional safety device circuit to be inserted as a sm-Controller based on the Sub-Controller. More specifically, as shown in FIG. 20, the functional safety system specified by the specification T1 is a triplex circuit (TRM). Therefore, the high-level synthesizing unit 50 creates a redundancy circuit (FSM1, FSM2) and a majority circuit (vote0) for the Sub-Controller as a sm-Controller (see FIG. 30).

In step S6_6, the high-level synthesizing unit 50 stores the sm-Controller created in step S6_5 as a SM-Controllers in the data storage unit 40. The information stored as the SM-Controllers is used in RTL description creation S7, which will be described later.

Then, the process returns to step S6_3. However, since the specification T1 is extracted from the extraction description T0 in the previous step S6_3, the extraction description T0 is empty (T0=$\varphi$). Therefore, in this step S6_3, the high-level synthesizing unit 50 determines that the extraction description T0 is empty ($\varphi$) (No), and ends the processing of the function safety system insertion (2) S6.

Next, the RTL description generation S7 will be described. In the RTL description generation S7, an RTL description with a functional safety system including the functional safety system inserted in the functional safety system insertion (1) S2 and the functional safety system inserted in the functional safety system insertion (2) S6 is generated in accordance with the functional safety system implementation specification. In the following description, an RTL description is shown as a circuit diagram for easy understanding.

Figure 31:
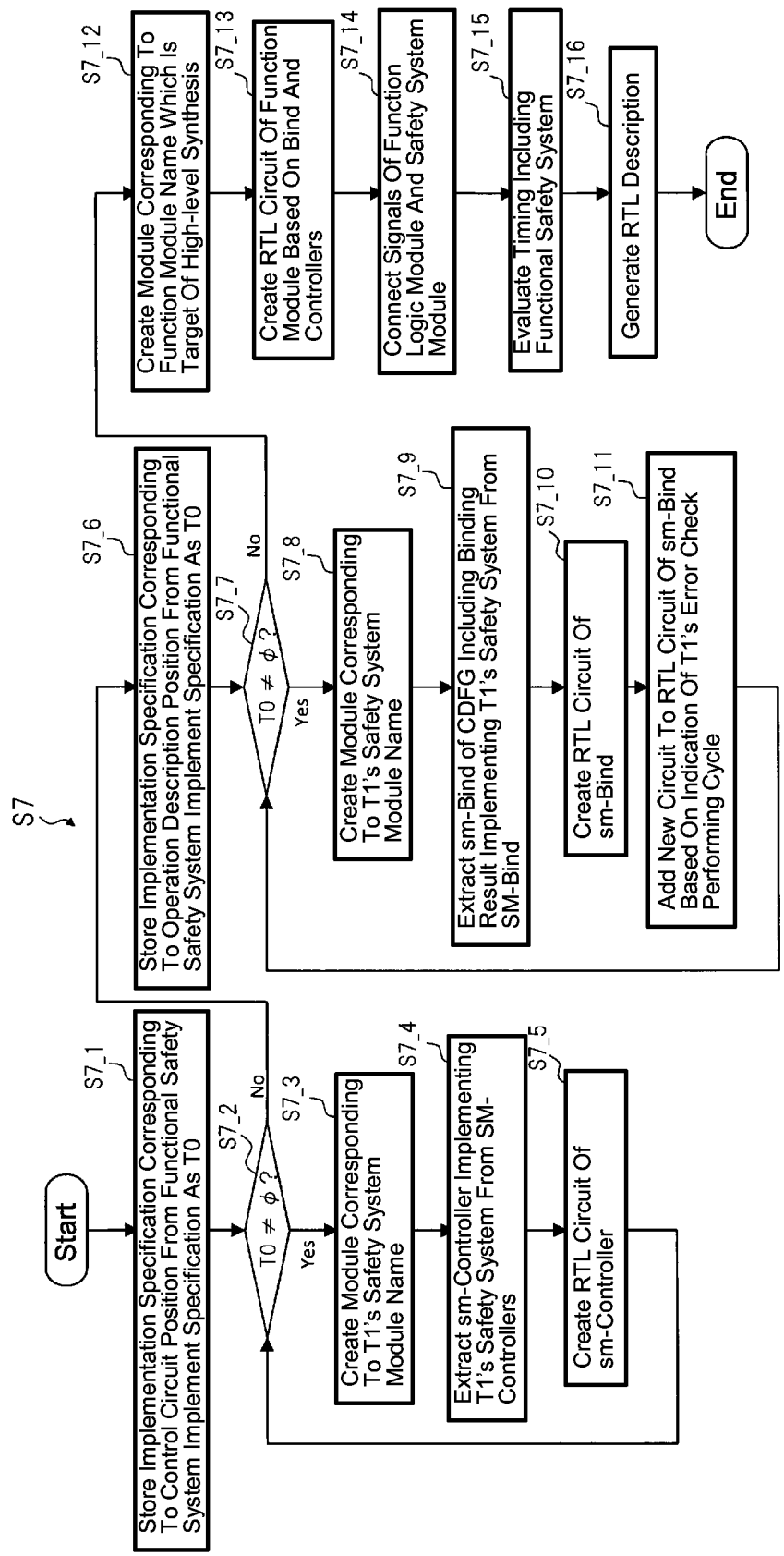
FIG. 31 is a flow diagram showing an example of RTL description generation.

FIG. 31 is a flow diagram showing an example of RTL description generation. The RTL description generation S7 of FIG. 31 includes steps S7_1 to S7_16.

In step S7_1, only the part of the implementing specification for the high-level synthesis control circuit is extracted from the functional safety system implementing specification. For example, the high-level synthesizing unit 50 extracts the implementing specification for the control circuit FSM0 of the second row from the functional safety system implementing specification 130 of FIG. 20. The high-level synthesizing unit 50 stores the extracted portion in the data storage unit 40 as the extraction description T0.

In step S7_2, the high-level synthesizing unit 50 determines whether or not the extraction description T0 is empty (φ). Step S7_2 is similar to step S2_3 and the like. If it is determined that the extraction description T0 is not empty (Yes), the high-level synthesizing unit 50 extracts the implementing specification (specification T1) for the control-circuit FSM0 from the extraction description T0. Then, the processing of the subsequent step S7_3 is executed.

On the other hand, when the high-level combining unit 50 determines that the extraction description T0 is empty (p) (No), the treatment of step S7_6 is performed.

In step S7_3, the high-level synthesizing unit 50 creates a module CHK in accordance with the function safety system module name specified in the specification T1.

In S7_4, the high-level synthesizing unit 50 extracts the circuit for realizing the functional safety system of the control circuit FSM0 specified in the specification T1 from the SM-Controllers created in the functional safety system inserting (2) S6. The extracted circuits are set to sm-Controller (see S6_6). In this embodiment, the control circuit FSM1, the control circuit FSM2, and the majority circuit vote0 are sm-Controller.

Figure 32:
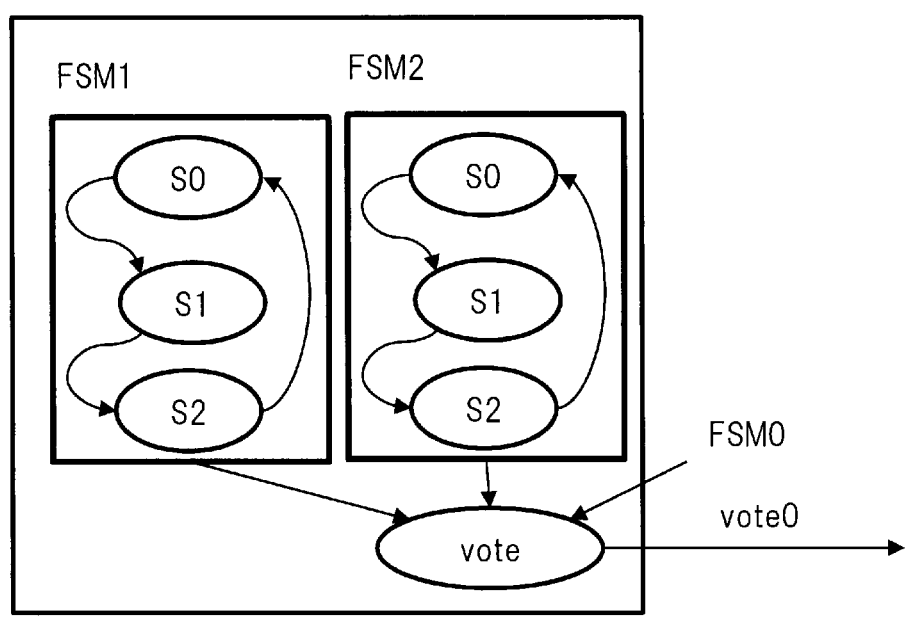
FIG. 32 is a diagram showing an exemplary RTL circuit of the sm-Controller.

In step S7_5, the high-level synthesizing unit 50 creates the RTL circuit of the sm-Controller extracted in step S7_4. FIG. is a diagram showing an exemplary RTL circuit of the sm-Controller. The module CHK of FIG. 32 includes a control circuit FSM1, FSM2 and a majority circuit vote0. The majority decision circuit vote0 performs majority decision of the output signal of the control circuit FSM0, FSM1, FSM2, and outputs the result of the majority decision as a signal vote0.

Then, the process returns to step S7_2. However, since the specification T1 is extracted from the extraction description T0 in the previous step S7_2, the extraction description T0 is empty (T0=φ). Therefore, in this step S7_2, the high-level synthesizing unit 50 determines that the extraction description T0 is empty (φ) (No), and executes the process of step S7_6.

In step S7_6, the high-level synthesizing unit 50 extracts only the description of the implementing specification for the operation description position from the functional safety system implementing specification. In this example, the high-level synthesizing unit 50 extracts the description on the implementing specification for the second-third line of the operation description 110 in the first line of the functional safety system implementing specification 130 of FIG. 20, and stores the extracted portion in the data storage unit 40 as the extraction description T0.

Step S7_7 is similar to step S7_2. In step S7_7, the high-level synthesizing unit 50 determines whether or not the extraction description T0 is empty (φ). When it is determined that the extracted description T0 is not empty (Yes), the high-level synthesizing unit 50 extracts the implementation specification (specification T1) for the second-third line of the operation description from the extracted description T0. Then, the processing of the subsequent step S7_8 is executed.

On the other hand, when the high-level combining unit 50 determines that the extraction description T0 is empty (φ) (No), the treatment of step S7_12 is performed.

In step S7_8, the high-level synthesizing unit 50 creates a module CHK in accordance with the function safety system module name specified in the specification T1. However, since the module CHK has already been created in step S7_3, a new module is not created.

In step S7_9, the high-level synthesizing unit 50 extracts, from the SM-Bind created in the binding S4, the circuits for realizing the functional safety systems of the second to third lines of the operation description specified in the specifications T1. The extracted circuits are the sm-Bind of the CDFG with the binding result. In this example, for example, mul1, add1, cmp0, r3, cmp1, or0, and r4 shown in FIG. 33, which will be described later, are sm-Bind.

In step S7_10, the high-level synthesizing unit 50 creates the RTL circuit of the sm-Bind extracted in step S7_9.

Figure 33:
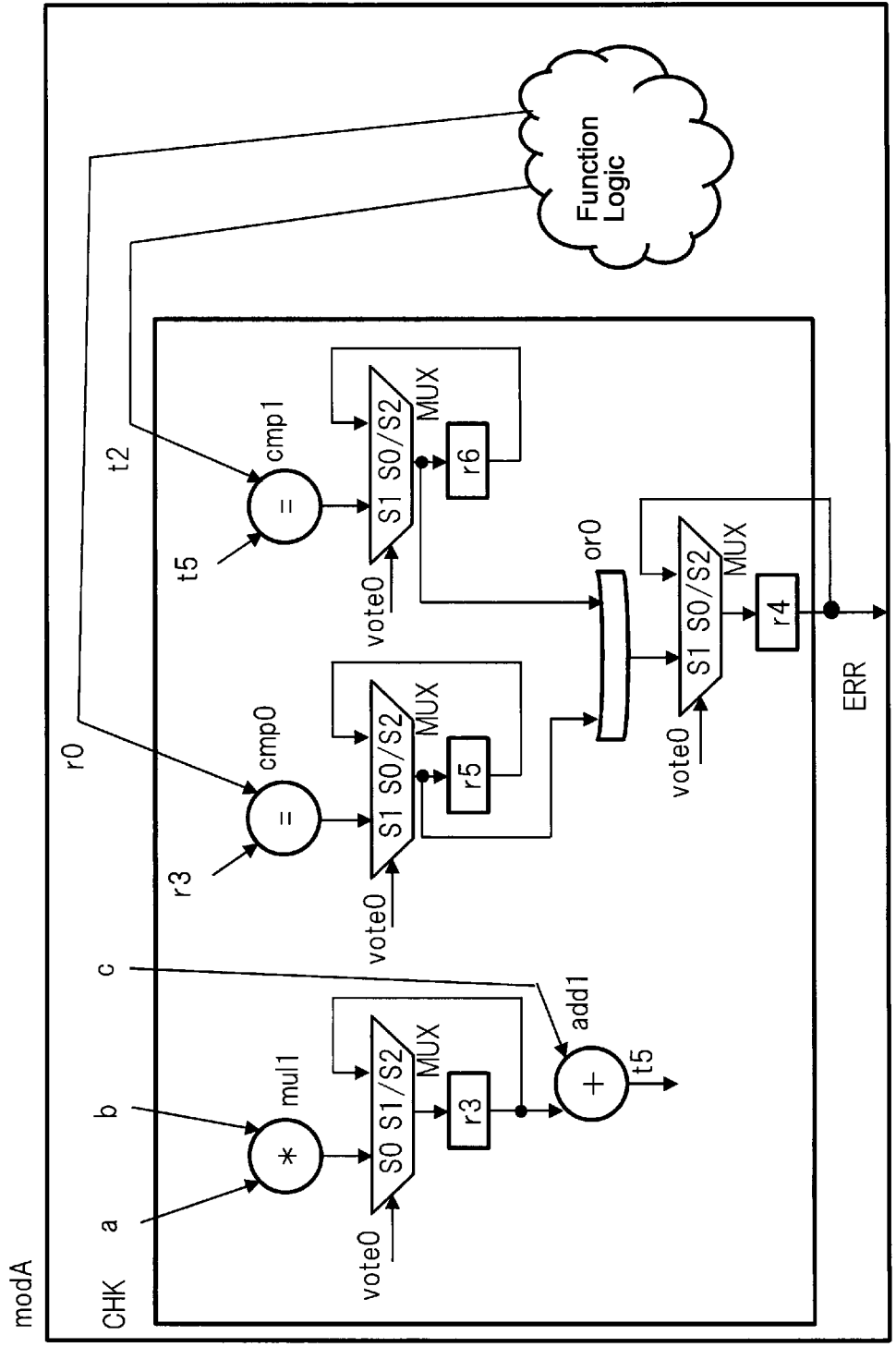
FIG. 33 is a diagram showing an example of an RTL circuit generated in RTL description generation.

In step S7_11, a new circuit is added to the RTL description created in step S7_10. In the specification T1, "Exec-Cond" is specified as the error check cycle. Therefore, the high-level synthesizing unit 50 generates a circuit that propagates the cmp0, cmp1, or0 result only in the state St1 corresponding to the cycle in which the value of the error check input signal is updated. More specifically, in step S7_11, the selection circuit MUX (multiplexer) is generated at the preceding stage of r5, r6, and r4, r5, r6. The selection signal inputted to the selection circuit MUX generated here is the signal vote0 of FIG. 32, which is the majority vote result of the triplexing circuit. FIG. 33 is a diagram showing an example of an RTL circuit generated in RTL description generation. The modules CHK of FIG. 33 include mul1, add1, cmp0, cmp1, or0, r3, r4, r5, r6, and four MUXes.

Then, the process returns to step S7_7. However, since the specification T1 is extracted from the extraction description T0 in the previous step S7_7, the extraction description T0 is empty (T0=φ). Therefore, in this step S7_7, the high-level synthesizing unit 50 determines that the extraction description T0 is empty (φ) (No), and executes the process of step S7_12.

In step S7_12, a module corresponding to the function module name of the high-level synthesis target is created. For example, the high-level synthesizing unit 50 identifies the function module names including the second-third line from the description of the first line from the operation description 110, and creates a new module modA.

Figure 34:
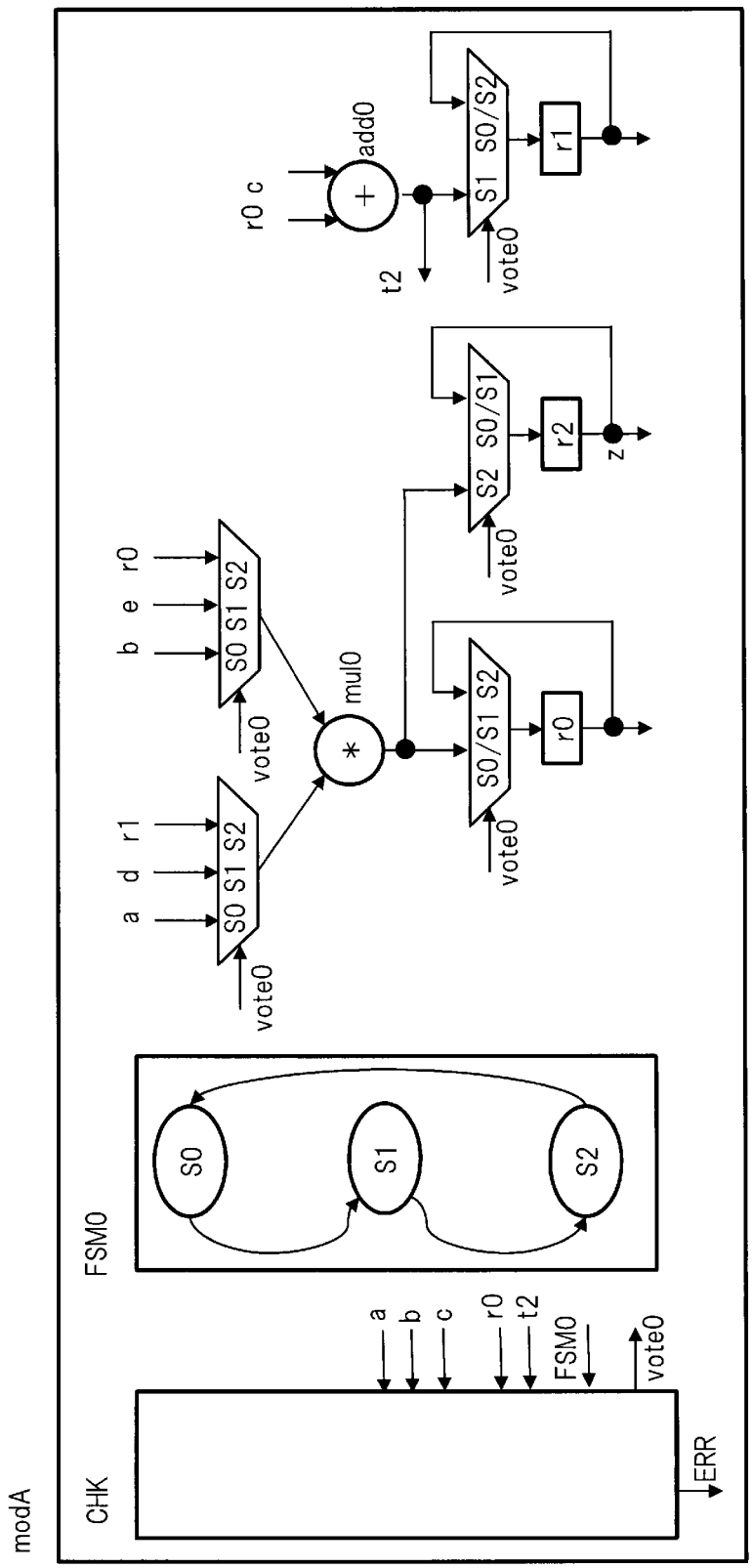
FIG. 34 is an RTL-circuit of the module modA.

In step S7_13, the high-level synthesizing unit 50 creates RTL circuits of the function modules based on the Bind created in the binding S4 and the Controllers created in the function safety device inserting (2) S6. FIG. 34 is a diagram showing an example of the RTL circuit generated in step S7_13. FIG. 34 is an RTL-circuit of the module modA. As shown in FIG. 34, the module modA includes functional logics, such as FSM0, and a module CHK implementing functional safety systems.

Figure 35:
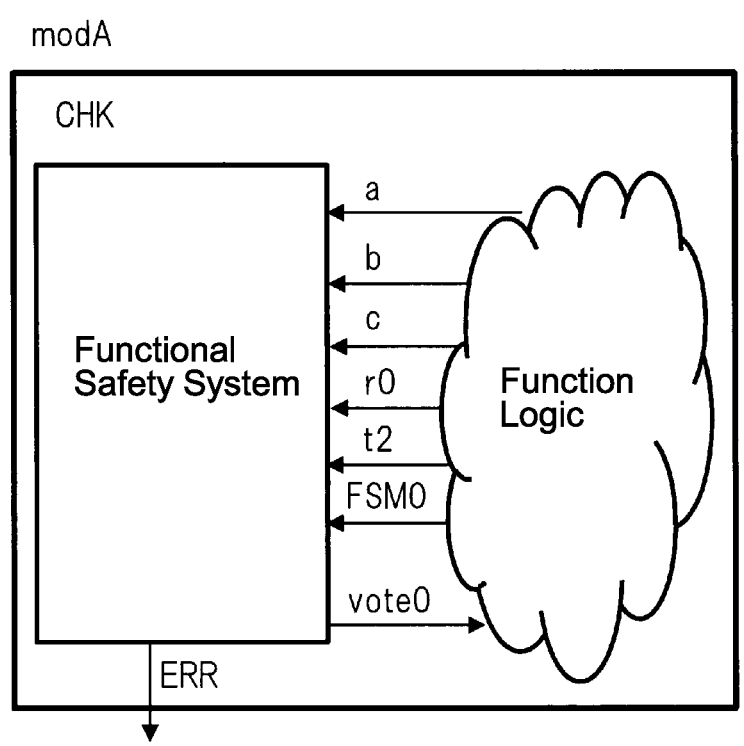
FIG. 35 is a diagram showing an example of the RTL circuit after signal connection.

In step S7_14, the high-level synthesizing unit 50 performs signal connection between the function logic and the module CHK of the function safety system. FIG. 35 is a diagram showing an example of the RTL circuit after signal connection.

In step S7_15, timing evaluation including the functional safety system is performed. The timing evaluation may be performed by the high-level synthesizing unit 50. The flow of FIG. 31 shows a case where there is no timing violation, but when it is determined that the timing violation has occurred, the processing from the scheduling S3 is executed again for the corresponding path. This processing is equivalent to the post-schedule performed after the creation of the control circuit at the time of general high-level synthesis.

In step S7_16, the high-level synthesizing unit 50 generates an RTL description for realizing FIGS. 32 to 35. In step S7_16, the RTL description 140 with the functional safety system is finally generated.

In FIG. 1, the processor 10 and the nonvolatile memory 20 are included in the high-level synthesizing apparatus 1, but they may be provided in different apparatuses. Specifically, the device including the processor and the device including the nonvolatile memory constitute a high-level synthesis system connected via a wired, wireless, or network. In such a high-level synthesis system, the high-level synthesis described above may be performed.

According to the present embodiment, the effect-level synthesizing unit 50 performs high-level synthesis using the operation description 110, the high-level synthesizing script 120, and the function safety system implementing specification 130, and generates an RTL description in which the function safety system is inserted. In addition, the high-level synthesizing unit 50 inserts the function safety system into an arbitrary position of the operation description 110 specified in the function safety system implementing specification 130. The high-level synthesizing unit 50 generates a CDFG S1 using the operation description 110, and then performs a first function safety system insertion process S2 of inserting the function safety system into the CDFG according to the function safety system implementing specifications 130. According to this configuration, since the functional safety system which is the redundant logic is not deleted, it is possible to generate an RTL description in which an arbitrary functional safety system is mounted for a circuit which executes the logic of an arbitrary operation description and a control circuit which is generated by high-level synthesis based on the functional safety system implementing specification 130.

Further, in the present embodiment, in the first function safety system inserting process S2, after the CDFG in which the function safety system is inserted is generated, the scheduling process S3 based on the high-level synthesis constraint defined by the high-level synthesis scripts 120 is performed. According to this configuration, since the execution timing of each calculator is appropriately set based on the estimation of the delay time in each cycle, an increase in necessary circuit elements can be suppressed.

Embodiment 2

Next, a description will be given of the second embodiment. In the following, the description of the portions overlapping with those of the above-described embodiments will be omitted in principle.

Figure 36:
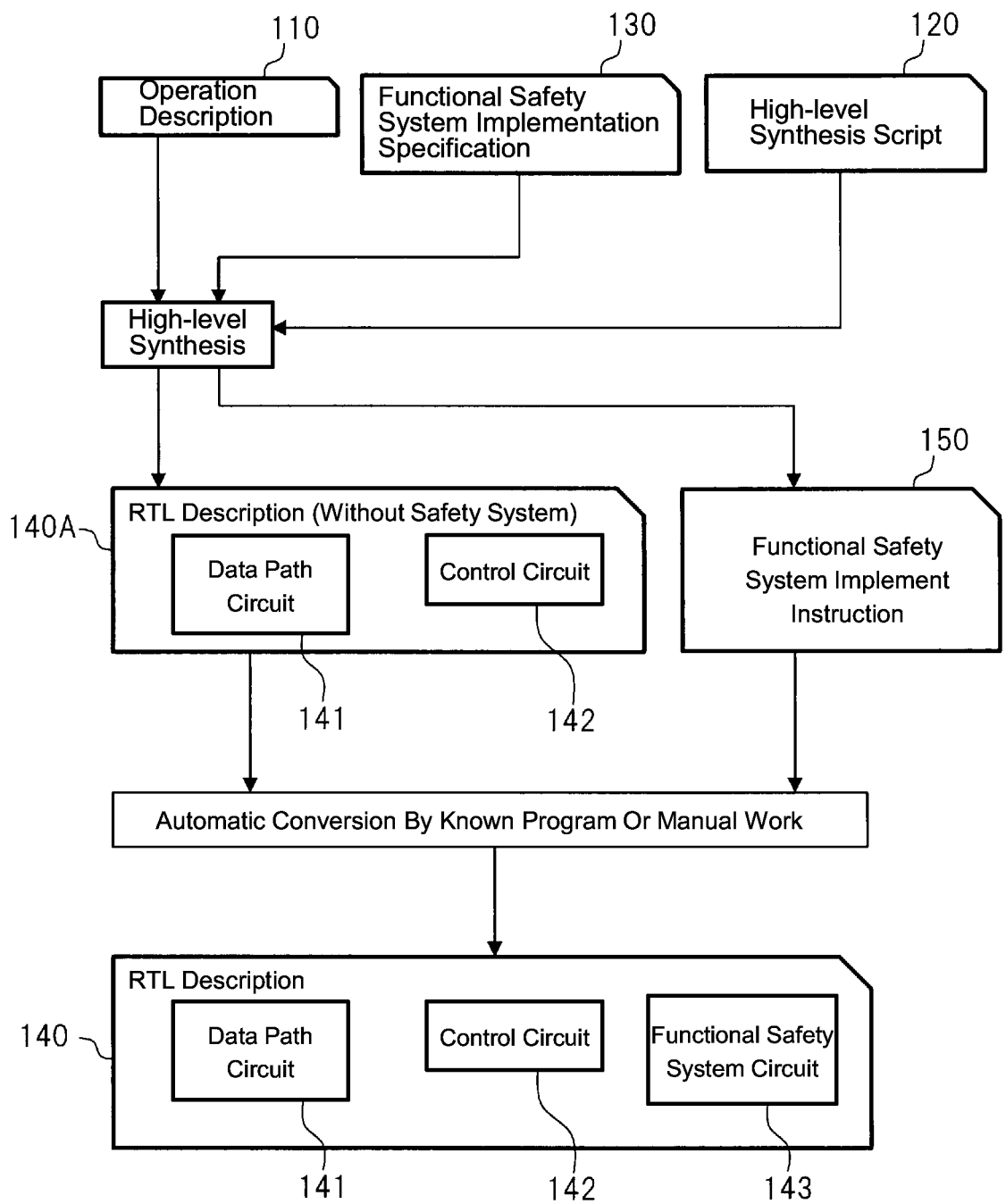
FIG. 36 is a diagram for explaining an outline of high-level synthesis according to Embodiment 2 of the present invention.

FIG. 36 is a diagram for explaining an outline of high-level synthesis according to Embodiment 2 of the present invention. The operation description 110, the high-level synthesis script 120, and the functional safety system implementation specification 130 of FIG. 36 are prepared in advance by the user as in the first embodiment. In the high-level synthesis of the present embodiment, first, an RTL description in which a functional safety system is not mounted is generated. Along with this RTL description, a functional safety system implementing instruction is generated for the RTL description in which the functional safety system is not mounted, in accordance with the functional safety system implementing specification. Then, the functional safety system is added to the RTL description based on the functional safety system implementing instruction. The addition of the functional safety system is performed by, for example, automatic conversion of a program shown in Non-Patent Document 2 or the like, or manual operation.

Figure 37:
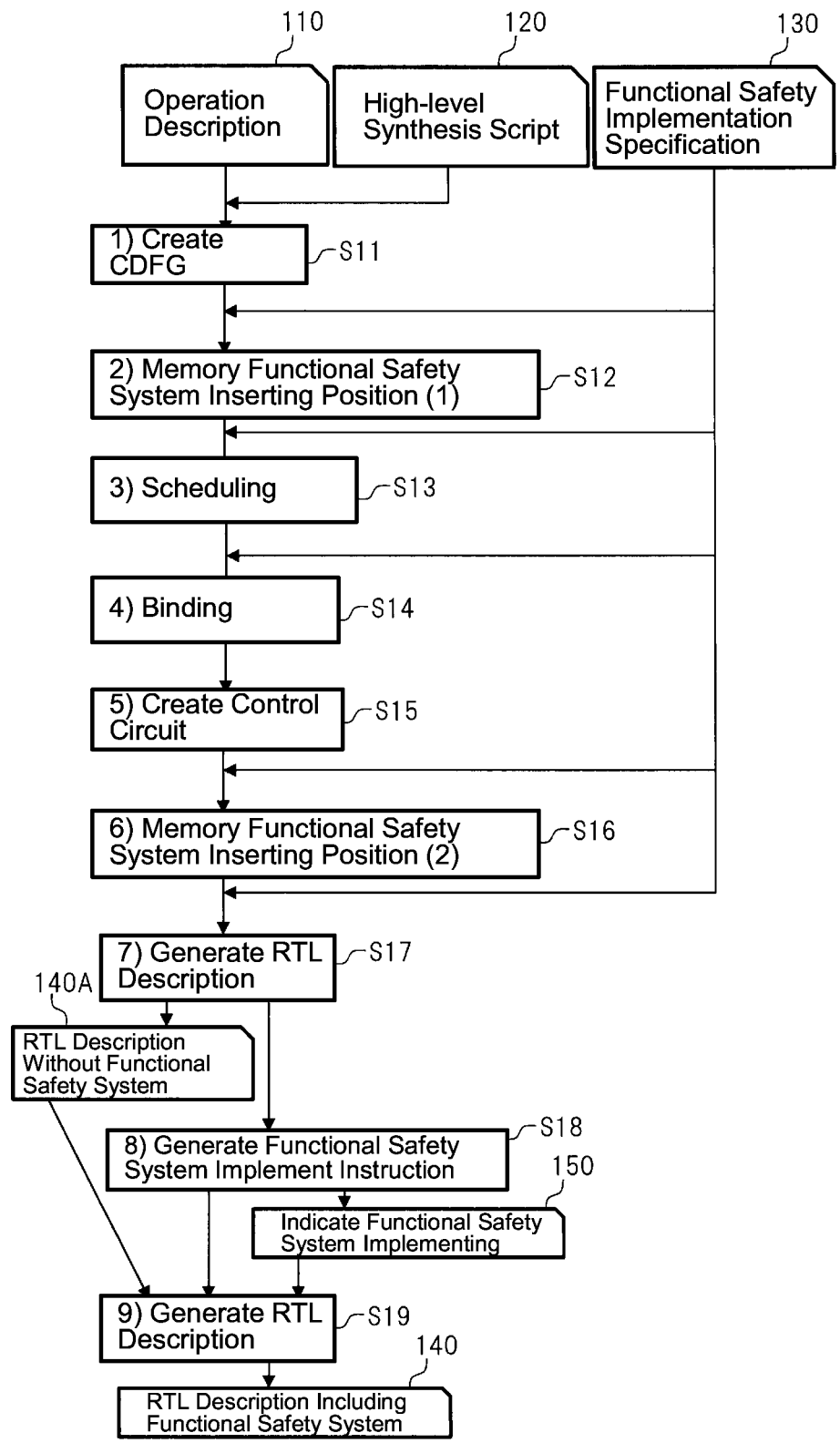
FIG. 37 is an explanatory diagram showing an example of a high-level synthesis method according to Embodiment 2 of the present invention.

FIG. 37 is an explanatory diagram showing an example of a high-level synthesis method according to Embodiment 2 of the present invention. As shown in FIG. 37, in the high-level composition of the present embodiment, processes of CDFG creation S11, functional safety system insertion position record (1) S12, scheduling S13, binding S14, control circuit creation S15, functional safety system insertion position record (2) S16, RTL description creation S17, functional safety system implementing instruction creation S18, and functional safety system insertion S19 are executed. Similar to the first embodiment, the user creates the respective files of the operation description 110, the high-level synthesis script 120, and the function safety system implementation specification 130 shown in FIG. 20, for example, and transfers them to the high-level synthesis apparatus 1.

Since the CDFG creation S11 of FIG. 37 is the same as the CDFG creation S1 of FIG. 19, the explanation thereof is omitted.

In the function safety system insertion position record (1) S12, the insertion position of the function safety system is recorded in accordance with the function safety system implementing specification. Similar to the functional safety system insertion (1) S2 of FIG. 19, the functional safety system insertion position recording (1) S12 is always performed after the CDFG creation S1 and prior to the scheduling S3.

Figure 38:
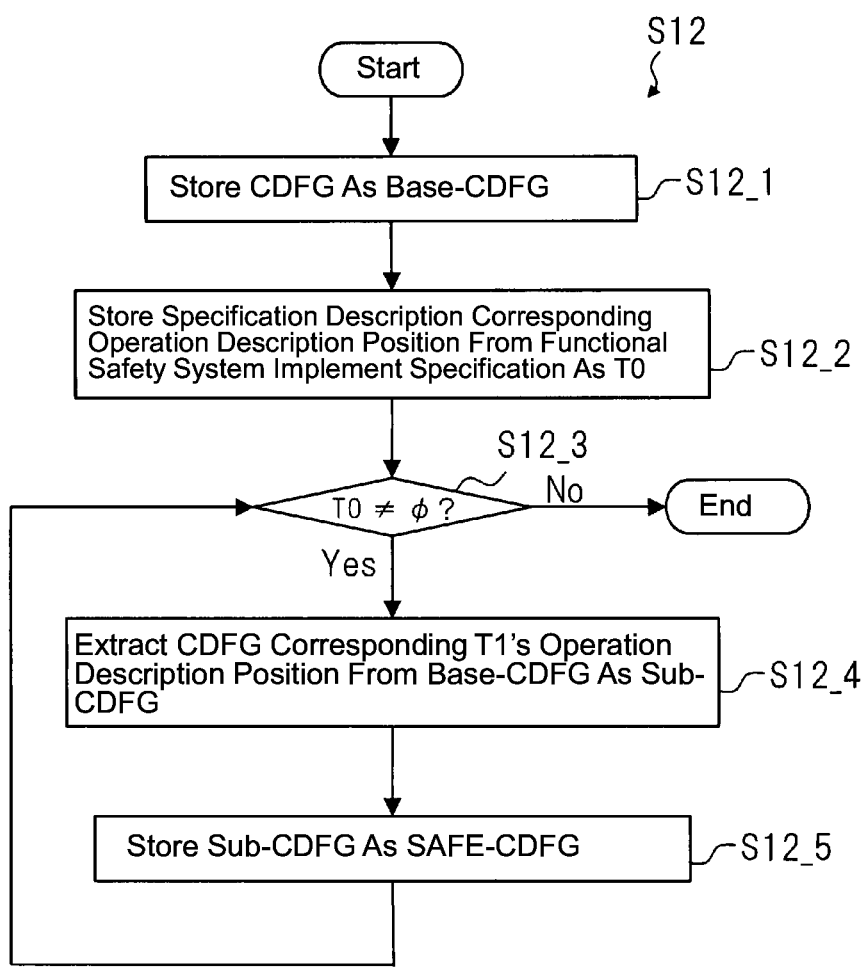
FIG. 38 is a flow diagram showing an example of the functional safety system insertion position record (1).

FIG. 38 is a flow diagram showing an example of the functional safety system insertion position record (1). The functional safety system insertion position record (1) S12 shown in FIG. 38 includes steps S12_1 to S12_5. In steps S12_1 to S12_4, the same processing as in steps S2_1 to S2_4 of FIG. 22 is executed.

Figure 39:
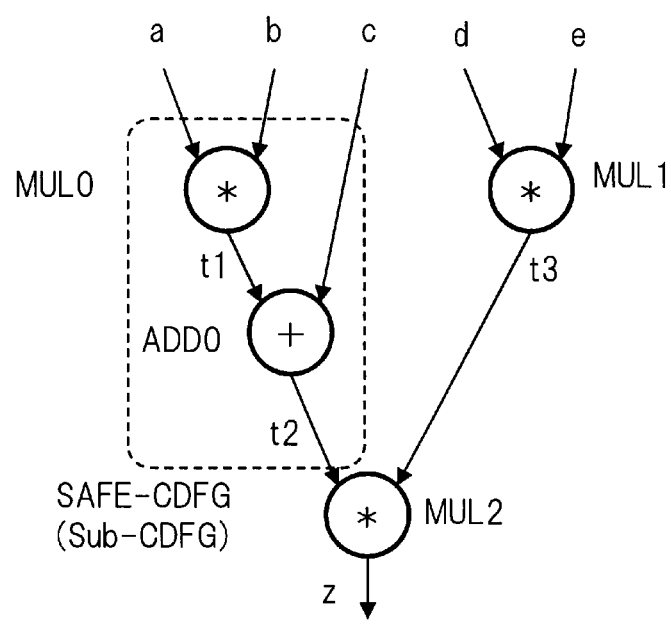
FIG. 39 is a diagram illustrating an exemplary Sub-CDFG.

FIG. 39 is a diagram illustrating an exemplary Sub-CDFG. The Sub-CDFG of FIG. 39 is similar to the Sub-CDFG of FIG. 23. Also in FIG. 37, vertices MUL0, ADD0 and sides a, b, c, t1, and t2 are created as Sub-CDFG. In this manner, the position of the functional safety feature is recorded in the Sub-CDFG.

In step S12_5, the high-level synthesizing unit 50 stores the Sub-CDFG created in step S12_4 as a SAFE-CDFG in the data storage unit 40. The SAFE-CDFG is used in scheduling S3, which will be described later.

Then, the process returns to step S12_3. However, since the specification T1 is extracted from the extraction description T0 in the previous step S12_3, the extraction description T0 is empty (T0=φ). Therefore, in this step S12_3, the high-level synthesizing unit 50 determines that the extraction description T0 is empty (p) (No), and ends the processing of the functional safety system insertion position recording (1) S12.

Figure 40:
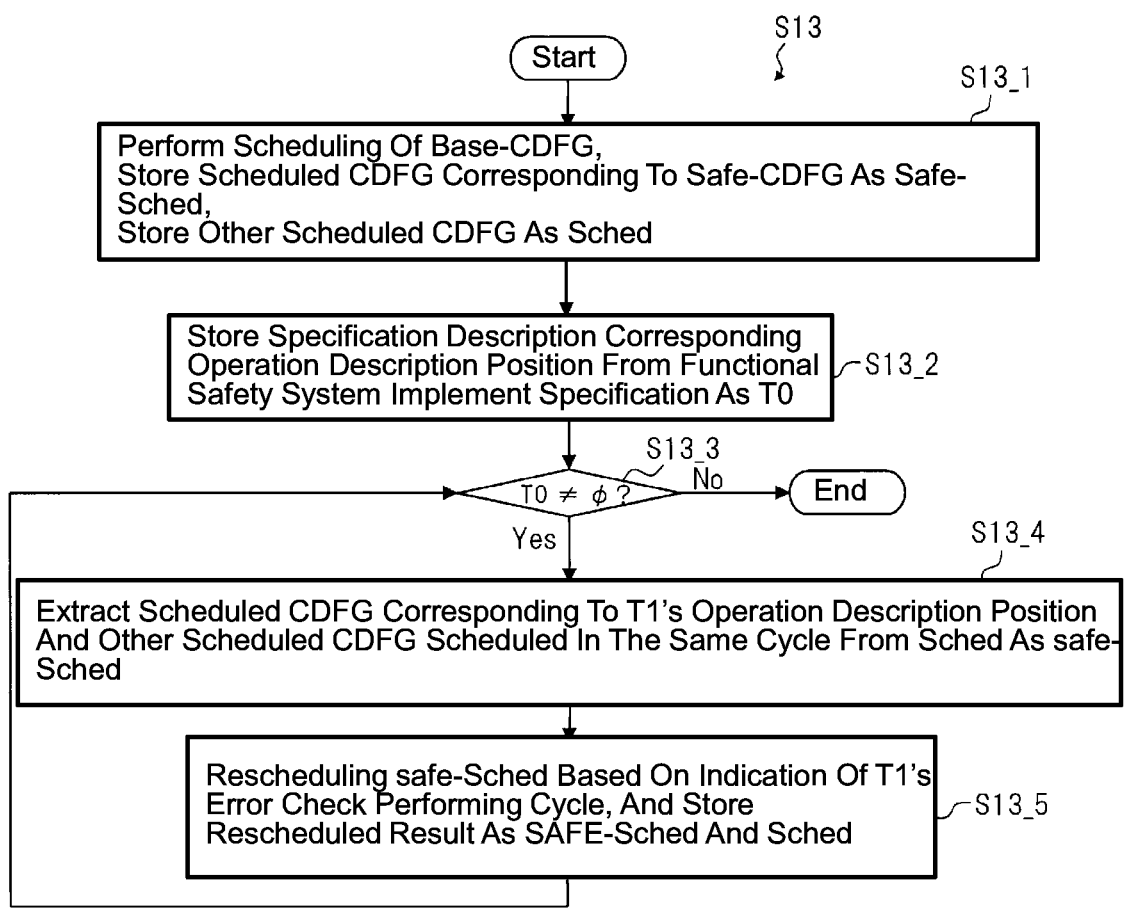
FIG. 40 is a flow diagram illustrating an example of scheduling.

Next, the scheduling S13 will be described. FIG. 40 is a flow diagram illustrating an example of scheduling. The scheduling S3 of FIG. 40 includes steps S13_1 to S13_5. Again, for a clock period of 10 ns, a clock cycle boundary is inserted.

In S13_1, the high-level synthesizing unit 50 schedules the SAFE-CDFG created in S12 of the functional safety device inserting position recording (1) stored in the data storage unit 40 by using the estimation result of the delay time. Then, the high-level synthesizing unit 50 stores the scheduled CDFG corresponding to the SAFE-CDFG in the data storage unit 40 as a SAFE-Sched. The high-level synthesizing unit 50 also performs scheduling for other CDFG, and stores the scheduled CDFG as a Sched in the data storage unit 40.

In steps S13_2 to S13_3, the same processing as in steps S3_2 to S3_3 is executed. In operation S13_4, the high-level synthesizing unit 50 fetches the scheduled CDFG corresponding to the second-third line from the SAFE-Sched and the other scheduled CDFG scheduled in the same cycle from the Sched from the operation description position specified in the specification T1, and sets the fetched CDFG as the safe-Sched.

In operation S13_5, the high-level synthesizing unit 50 reschedules the safe-Sched according to the error check cycle because the specification T1 specifies the specification T1. The high-level synthesizing unit 50 updates the SAFE-Sched and Sched stored in the data storage unit 40 by using the rescheduling result. FIG. 41 is a diagram for explaining how to schedule a safe-CDFG. The scheduling result shown in FIG. 41 is the same as the Sched on the right side of FIG. 25.

Then, the process returns to step S13_3. However, since the specification T1 is extracted from the extraction description T0 in the previous step S13_3, the extraction description T0 is empty (T0=φ). Therefore, in the present step S13_3, the high-level synthesizing unit 50 determines that the extraction description T0 is empty (φ) (No), and the treatment of the scheduling S13 ends.

Figure 42:
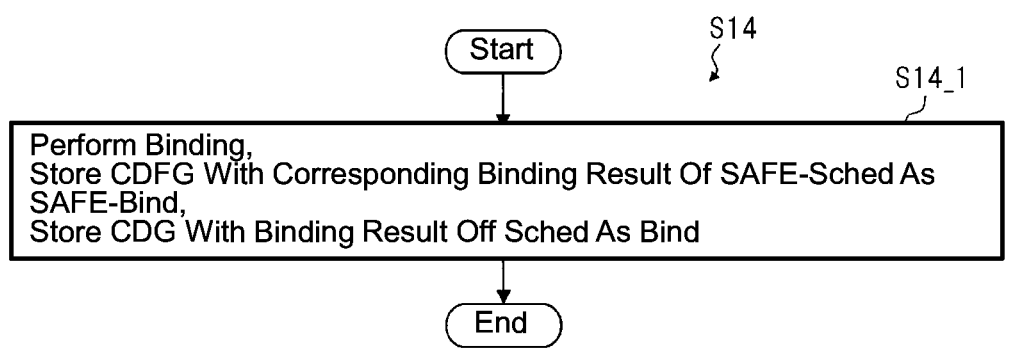
FIG. 42 is a flow diagram illustrating an example of binding.
Figure 43:
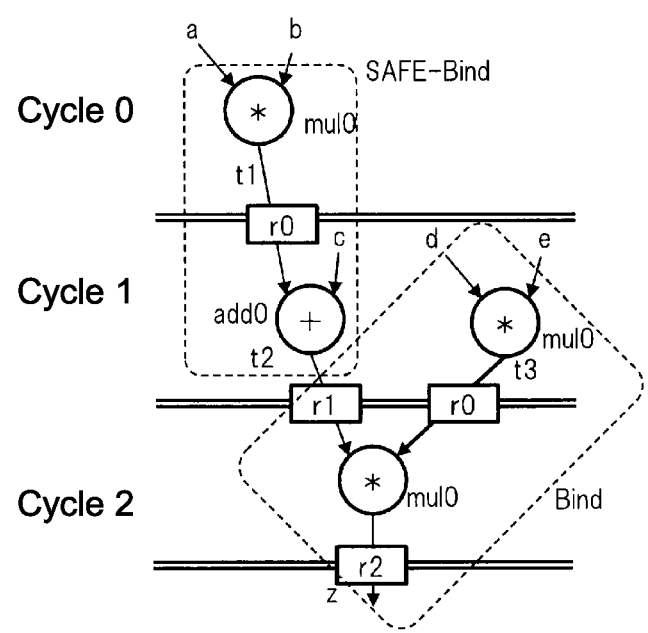
FIG. 43 is a diagram for explaining the binding method.

Next, the binding S14 will be described. FIG. 42 is a flow diagram illustrating an example of binding. FIG. 43 is a diagram for explaining the binding method. In step S14_1, the high-level synthesizing unit 50 maps the CDFG included in the SAFE-sched updated in the scheduling step S13.

More specifically, as shown in FIG. 43, the high-level synthesizing unit 50 maps mul0 to multiplications and add0 to additions. Then, the high-level synthesizing unit 50 stores the CDFG with the mapping result as a SAFE-Bind in the data storage unit 40. In addition, the high-level synthesizing unit 50 maps the register r0 to the data path crossing the clock boundary, and stores the CDFG including the mapping result of the register r0 in the data storage unit 40 as a SAFE-Bind. The high-level synthesizing unit 50 also binds other CDFG, and stores the binding result as a Bind in the data storage unit 40.

Next, in the control circuit creation S15, similarly to the control circuit creation S5 of FIG. 19, a control circuit for controlling the operation in each cycle determined by the scheduling result is generated (see FIG. 28).

<Functional safety system insertion position recording (2)>> Next, the functional safety system insertion position recording (2) S16 will be described. In the functional safety system insertion position recording (2) S16, the insertion position of the functional safety system with respect to the control circuit is recorded in accordance with the functional safety system implementing specification. Here, the insertion position of the functional safety system is recorded for the control circuit generated by the high-level synthesis. The functional safety system insertion position record (2) S16 is always performed after the control circuit creation S15, as in the functional safety system insertion (2) S6 of FIG. 19.

Figure 44:
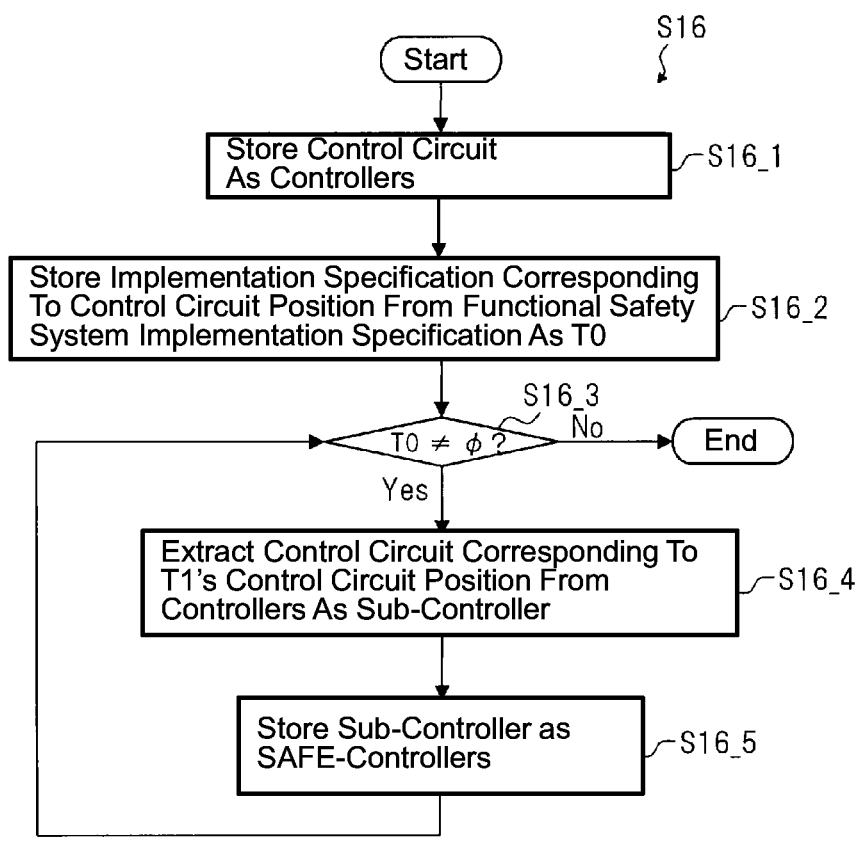
FIG. 44 is a flowchart showing an example of the functional safety system insertion position record (2).

FIG. 44 is a flowchart showing an example of the functional safety system insertion position record (2). The functional safety system insertion position record (2) S16 of FIG. 44 includes steps S16_1 to S16_5. In steps S16_1 to S16_4, the same processing as in steps S6_1 to S6_4 of FIG. 29 is executed. In the Sub-Controller created in S16_4, the position at which the functional safety systems of the FSM0 are inserted is recorded.

In step S16_5, the high-level synthesizing unit 50 stores the Sub-Controller created in step S16_4 as a SAFE-Controllers in the data storage unit 40. The information stored as the SAFE-Controllers is used in the RTL description creation S17, which will be described later.

Then, the process returns to step S16_3. However, since the specification T1 is extracted from the extraction description T0 in the previous step S16_3, the extraction description T0 is empty (T0=φ). Therefore, in this step S16_3, the high-level synthesizing unit 50 determines that the extraction description T0 is empty (φ) (No), and ends the processing of the functional safety system insertion position recording (2) S16.

Figure 45:
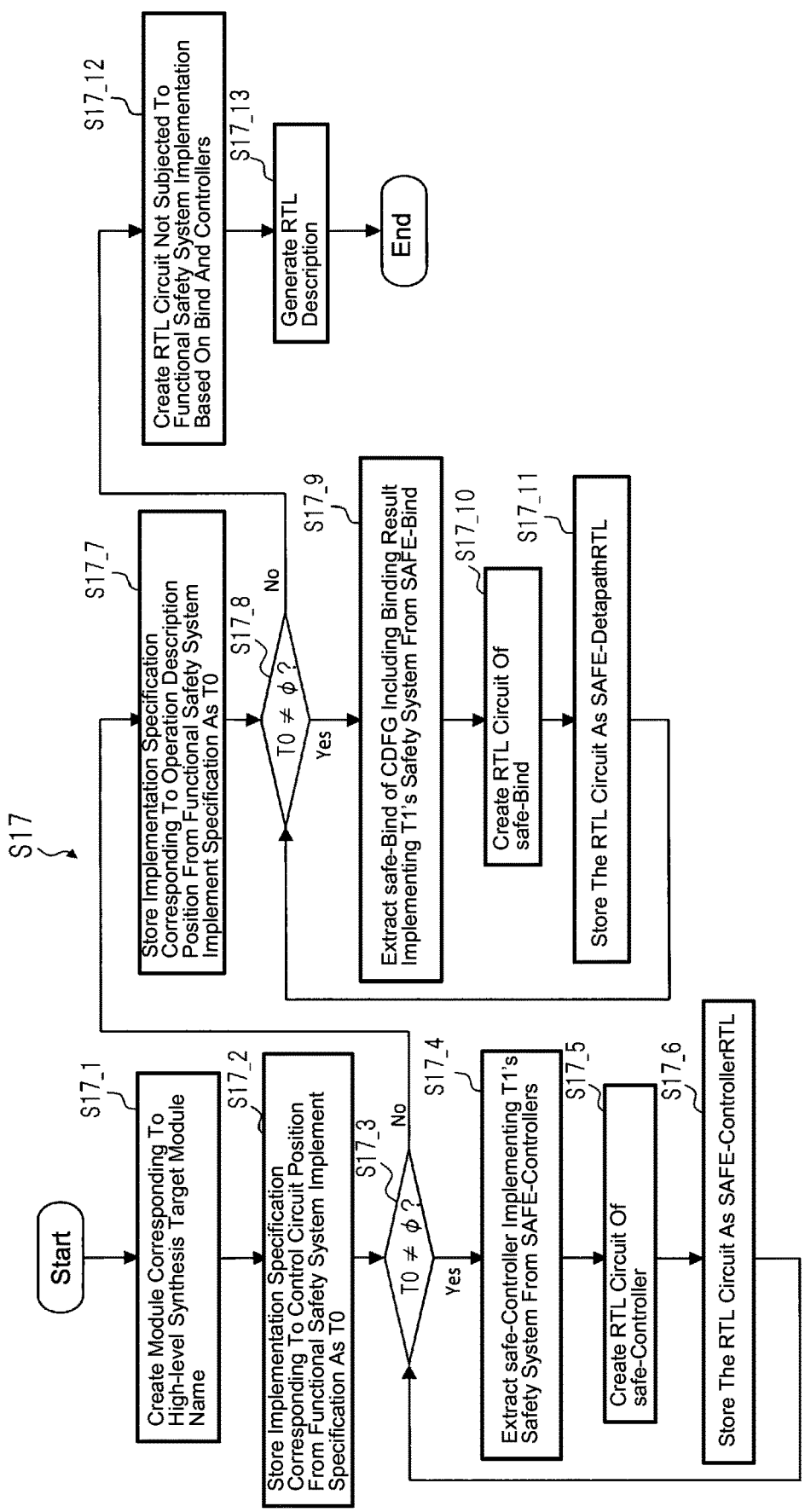
FIG. 45 is a flowchart showing an example of RTL description generation according to the second embodiment of the present invention.

Next, the RTL description generation S17 will be described. As described above, in the RTL description generation S17 of the present embodiment, an RTL description that does not include a functional safety system is generated. FIG. 45 is a flowchart showing an example of RTL description generation according to the second embodiment of the present invention. The RTL description generation S17 of FIG. 45 includes steps S17_1 to S17_13.

In step S17_1, the same processing as in step S7_12 of FIG. 31 is performed. The high-level synthesizing unit 50 creates a new module modA corresponding to the function module names of the high-level synthesizing targets. In steps S17_2 to S17_3, the same processing as in steps S7_1 to S7_2 in FIG. 31 is performed.

In step S17_4, the high-level synthesizing unit 50 extracts a circuit for realizing the functional safety system of the control circuit FSM0 specified in the specification T1 from the SAFE-Controllers created in the functional safety system inserting position recording (2) S16. The extracted circuits are safe-Controller. More specifically, the high-level synthesizing unit 50 takes out the control circuit FSM0 designated as the functional safety system-implementing target in the specification T1 from the SAFE-Controllers and sets the control circuit FSM0 as the safe-Controller.

In step S17_5, the high-level synthesizing unit 50 creates the RTL circuit of the safe-Controller extracted in step S17_4.

In step S17_6, the high-level synthesizing unit 50 stores the RTL circuit created in step S17_5 in the data storage unit 40 as a SAFE-ControllerRTL. The information stored as the SAFE-ControllerRTL is used in the functional safety system implementing instruction generation S18, which will be described later.

Then, the process returns to step S17_3. However, since the specification T1 is extracted from the extraction description T0 in the previous step S17_3, the extraction description T0 is empty (T0=φ). Therefore, in step S17_3 this time, the high-level synthesizing unit 50 determines that the extraction description T0 is empty (p) (No), and executes the process of step S17_7.

In steps S17_7 to S17_8, the same processing as in steps S7_6 to S7_7 in FIG. 31 is performed. In step S17_9, the high-level synthesizing unit 50 fetches, from the SAFE-Bind created in the binding S14, the circuits for realizing the functional safety systems of the second-third line of the operation description specified in the specifications T1. The extracted circuits are the safe-Bind of the CDFG with the binding result. In this embodiment, mul0, add0 and r0 shown in FIG. 46, which will be described later, are safe-Bind.

In step S17_10, the high-level synthesizing unit 50 creates the RTL circuit of the safe-Bind extracted in step S17_9.

In step S17_11, the high-level synthesizing unit 50 stores the RTL circuit created in step S17_10 in the data storage unit 40 as a SAFE-DatapathRTL. The information included in the SAFE-DatapathRTL is used in the functional safety system implementing instruction generation S18, which will be described later.

Then, the process returns to step S17_8. However, since the specification T1 is extracted from the extraction description T0 in the previous step S17_8, the extraction description T0 is empty (T0=φ). Therefore, in step S17_8 this time, the high-level synthesizing unit 50 determines that the extraction description T0 is empty (φ) (No), and executes the process of step S17_12.

Figure 46:
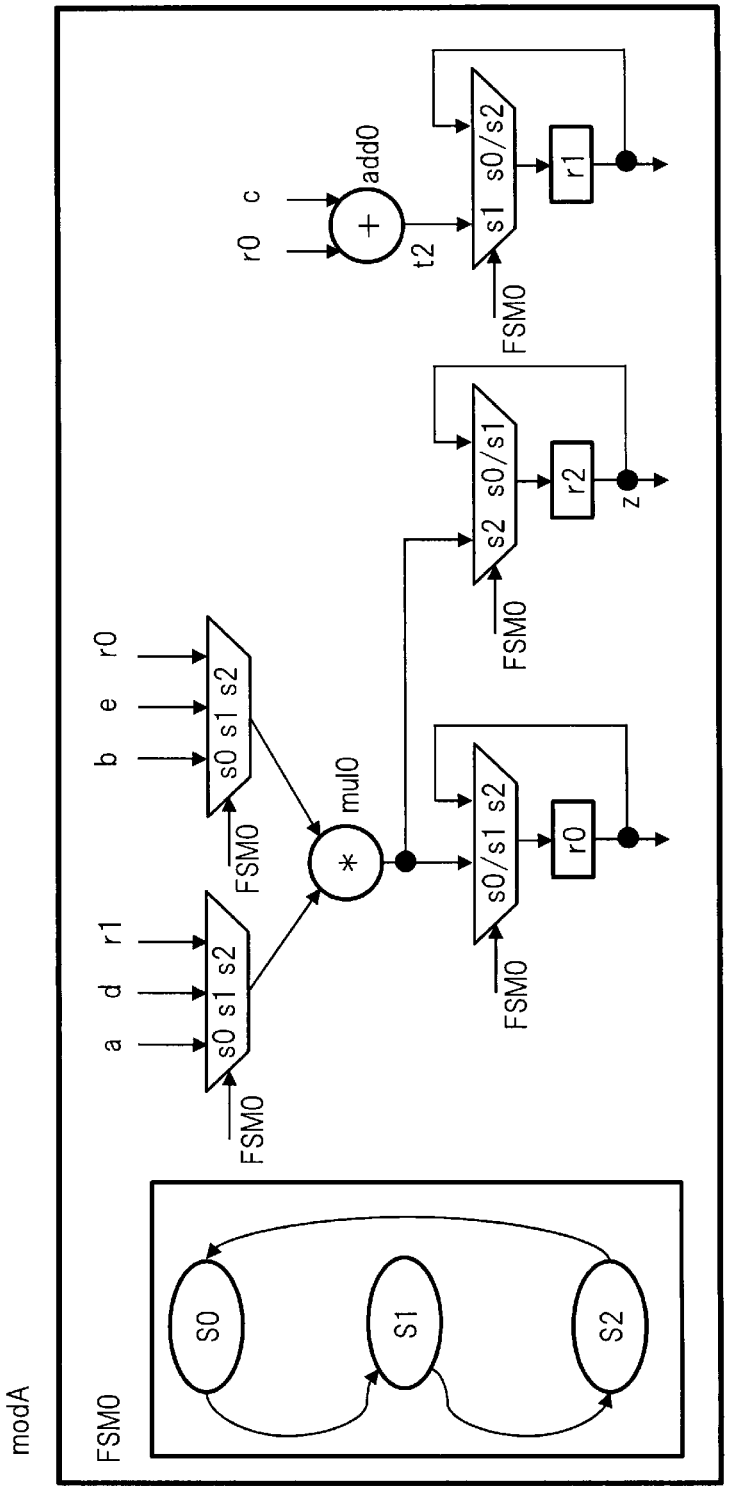
FIG. 46 is a diagram showing an example of the RTL circuit generated in step S17_13.

In step S17_12, the high-level synthesizing unit 50 creates the RTL description 140A using the Bind created in the binding S14 and the Controllers created in the function safety system inserting position recording (2) S16 (see FIG. 37). FIG. 46 is a diagram showing an example of the RTL circuit generated in step S17_13. FIG. 46 is a view corresponding to FIG. 34, and clearly shows the difference from the first embodiment. Comparing both figures, the RTL circuit of FIG. 46 does not include the functional safety module CHK. As described above, in the RTL description generation S17 of the present embodiment, the functional safety system is not yet implemented.

In step S17_13, the high-level synthesizing unit 50 generates an RTL description for realizing the RTL circuit of FIG. 46.

Next, the function safety system implementing instruction generation S18 will be described. In the functional safety system implementing instruction generation S18, the functional safety system implementing instruction 150 shown in FIG. 37 is generated in accordance with the functional safety system implementing specification and the RTL description generated in the RTL description generation S17. The functional safety system implementing instruction generated here includes a module implementing instruction and a resource implementing instruction.

In the module implementing instruction, for example, information such as "Name" designating a module name, "Input" designating an input signal, "Output" designating an output signal, and the like is output. That is, the module implementing instruction includes information on the module of the functional safety system.

On the other hand, information such as "Input" designating a connection source of an input signal, "Output" designating a connection destination of an output signal, "Enable" designating an update condition of an output, and "Module" designating a module name for resource creation is output as the resource implementation instruction. That is, the resource implementation instruction includes information about the resource of the module of the functional safety system.

Figure 47:
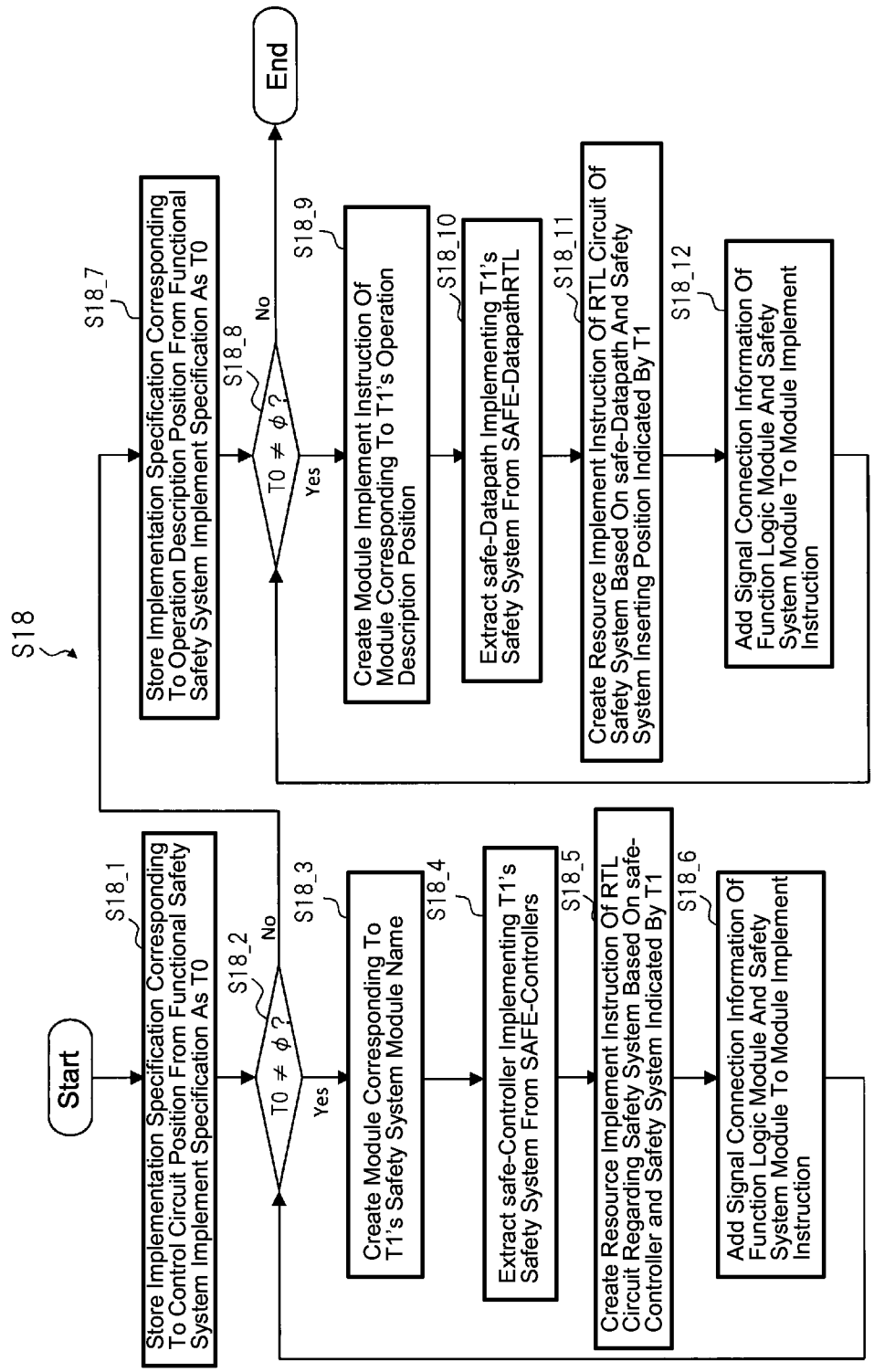
FIG. 47 is a flowchart showing an example of the functional safety system implementing instruction generation S18.

FIG. 47 is a flowchart showing an example of the functional safety system implementing instruction generation S18. FIG. 47 includes steps S18_1 to S18_12. In steps S18_1 to S18_2, for example, the same processing as in steps S17_2 to S17_3 in FIG. 45 is performed.

In step S18_3, the high-level synthesizing unit 50 generates a module implementing instruction related to the module CHK in accordance with the function safety system module name specified in the specification T1.

In operation S18_4, the high-level synthesizing unit 50 extracts the RTL circuit that implements the FSM0 specified in the specification T1 from the SAFE-ControllerRTL. The extracted RTL circuits are safe-Controller.

In step S18_5, a resource-implementing instruction of the RTL circuit related to the functional safety system is generated from the safe-Controller generated in step S18_4 and the functional safety system specified in the specification T1. Specifically, since the function safety system specified in the specification T1 is a triple circuit (TMR), the high-level combining unit 50 generates a resource-implementing instruction for realizing a redundant circuit and a majority circuit for the safe-Controller generated in operation S18_4.

In this embodiment, the high-level synthesizing unit 50 generates an instruction to implement FSM1, FSM2, vote0 resources. In the specifications T1, "Output" is specified as the error check input signal, and each clock cycle is specified as the error check input signal and the error check execution cycle. For this reason, the high-level synthesizing unit 50 generates a vote0 for taking a majority vote of the triplexing circuits every clock cycle, and connects the FSM0, FSM1, FSM2 to the vote0. Since "-" is specified as the error check output signal in the specification T1, the external-level synthesizing unit 50 does not output an instruction to generate an error notification signal to the outside. Then, the high-level synthesizing unit 50 generates an instruction for connecting the signal vote0, which is the majority vote result, to the mux having the FSM0 as the selection signal. The instruction generated here is information related to the "Output" of the resource-implementation instruction to the vote0.

In step S18_6, the signal connection information of the functional logic module and the functional safety system module is added to the module implementing instruction. More specifically, the high-level synthesizing unit 50 adds the signal connection information between the functional module modA and the signal connection information between the functional safety system module CHK to the module implementing instruction of the functional safety system module CHK. In this embodiment, the high-level synthesizing unit 50 adds an instruction to create a vote0 as an input of FSM0 and an output as an input of vote0 to the module implementing instruction of the function safety system module CHK.

Then, the process returns to step S18_2. However, since the specification T1 is extracted from the extraction description T0 in the previous step S18_2, the extraction description T0 is empty (T0=φ). Therefore, in this step S18_2, the high-level synthesizing unit 50 determines that the extraction description T0 is empty (φ) (No), and executes the process of step S18_7. In steps S18_7 to S18_8, the same processing as in steps S17_7 to S17_8 of FIG. 45 is executed.

In step S18_9, a module implementing instruction related to the function safety module CHK is generated in accordance with the function safety system module name specified in the specification T1. However, since the high-level synthesizing unit 50 has already created the module implementing instruction of the function safety module CHK in step S18_3, the high-level synthesizing unit 50 does not create a new module implementing instruction of the function safety module CHK.

In S18_10, circuits for realizing the functional safety systems of the specifications T1 are extracted from the SAFE-DatapathRTL. More specifically, the high-level synthesizing unit extracts from the SAFE-DatapathRTL the RTL circuit that realizes the content of the second-third line of the operation description specified in the specification T1. The extracted RTL circuit is a safe-Datapath circuit. In this embodiment, the safe-Datapath includes mul0, add0, r0, and MUXes that control these inputs and outputs.

In S18_11, a resource-implementing instruction for the RTL circuit of the functional safety system is generated from the safe-Datapath and the specification T1. More specifically, since the functional safety system specified in the specification T1 is a duplexing circuit, the high-level synthesizing unit 50 generates a resource implementing instruction for realizing the redundant circuit and the comparing circuit with respect to the safe-Datapath generated in step S18_10.

In this embodiment, the high-level synthesizing unit 50 generates resource-implementation instructions of mul1, add1 and r3 as redundant circuits of mul0, add0 and r0. The input signal of the add1 is r3, c corresponding to the input signal r0, c of the add0, and the output signal of the add1 is t5 corresponding to t2 of the output signal of the add0. The r 3 stores the result of outputting the mul1, and the updating condition is set to the state St0 in the same manner as the r0. The updated information is information of "Enable" of the resource-implementation instruction of r3.

Since the error check input signal specified in the specification T1 is "Output+F/F" as the comparison circuit, the high-level synthesizing unit 50 creates a resource implementing instruction for the resource or0 of the add0 result t2, which is the output of the second-third line of the operation description, and the add1 result t5, which is the redundant circuit of the add0, respectively, a cmp1 for comparing the values of the registers r0 and r3, which are the redundant circuits of the registers r0 added by the high-level synthesizing, and a logical sum OOJ of the comparison results of the cmp0 and the cmp1, as the comparison circuit.

In addition, since the error check result output signal specified by the specification T1 is "Port (ERR, F/F)", a resource-implementing instruction of r4 for storing the or0 result and a resource-implementing instruction of the external output ERR are created, respectively. Further, since "ExeCond" is specified as the error check cycle in the specification T1, the high-level synthesizing unit 50 generates a resource-implementation instruction for a circuit that propagates the cmp0, cmp1, or0 result only in the status St1. More specifically, the high-level synthesizing unit 50 generates r5 and r6 for holding the result of the cmp0, cmp1 in a state other than the state St1, and sets the updating condition of r4, r5, and r6 as St1. The updated information is information of "Enable" of the resource-implementation instructions of r4, r5, and r6.

In S18_12, the signal connection information between the function module modA and the function safety system module CHK is added to the module implementing instruction of the function safety system module CHK. In the present embodiment, the high-level synthesizing unit 50 adds instructions for creating a and b as mul1 inputs, c as add1 inputs, t2 as cmp0 inputs, r0 as cmp1 inputs, and ERRs as error check output signals to the module implementing instructions of the functional safety module CHK. FIG. 48 is a diagram showing an example of a functional safety system implementing instruction. A resource implementing instruction is created on the upper side of the functional safety system implementing instruction 150, and a module implementing instruction is created on the lower side of the functional safety system implementing instruction 150.

Then, the process returns to step S18_8. However, since the specification T1 is extracted from the extraction description T0 in the previous step S18_8, the extraction description T0 is empty (T0=φ). Therefore, in this step S18_8, the high-level synthesizing unit 50 determines that the extracted description T0 is empty (φ) (No), and the processing of the function safety system implementing instruction generating S18 ends.

Next, the functional safety system insertion S19 will be described. Based on the functional safety system implementing instruction 150 of FIG. 48, the functional safety system is inserted into the RTL description. Insertion of the functional safety system is performed by automatic program conversion or manual operation, as described above. As a result, the same RTL circuit as that of FIGS. 32 to 35 described in the first embodiment is generated.

According to the present embodiment, the effect-level synthesis unit 50 performs high-level synthesis using the operation description 110, the high-level synthesis script 120, and the function safety system implementing specification 130, and generates an RTL description 140A that does not include a function safety system, and a function safety system implementing instruction 150 for the RTL description 140A. According to this configuration, using the RTL description 140A and the functional safety system implementing instruction 150, it is possible to generate an RTL description in which an arbitrary functional safety system is mounted by a commercially available tool or a human being capable of implementing the functional safety system. In this way, it is possible to increase the method of implementing the functional safety system for the RTL description, and the generality is improved.

Although the invention made by the present inventor has been specifically described based on the embodiment, the present invention is not limited to the embodiment described above, and it is needless to say that various modifications can be made without departing from the gist thereof.

What is claimed is:
1. A method for a high-level code synthesis, the method comprising:
(a) generating a control data flow graph based on an operation description which defines a functional logic; and
(b) inserting a functional safety logic to the control data flow graph in accordance with a predetermined implementation specification.
2. The method according to claim 1,
wherein the (b) inserting is performed to a destination in the operation description specified in the predetermined implementation specification.
3. The method according to claim 2, further comprising:
(c) performing a scheduling process based on a high-level synthesis rule defined by a high-level synthesis script; and
(d) binding a result of the scheduling process with processors and registers of a target device corresponding to the control data flow graph.
4. The method according to claim 3, further comprising:
(e) generating a control circuit code based on the control data flow graph; and
(f) inserting the functional safety logic to the control circuit code in accordance with the predetermined implementation specification.
5. The method according to claim 4,
wherein the (f) inserting is performed to a destination in the operation description specified in the predetermined implementation specification.
6. The method according to claim 4, further comprising:
(g) generating an RTL code including the functional safety logic in accordance with the predetermined implementation specification.

7. The method according to claim 6,
wherein the (g) generating includes outputting the inserted functional safety logic to a module hierarchy specified by the predetermined implementation specification.

* * * * *